US012297857B2

(12) United States Patent
Hess et al.

(10) Patent No.: US 12,297,857 B2
(45) Date of Patent: *May 13, 2025

(54) FASTENER ASSEMBLIES AND NUT PLATE ASSEMBLIES FOR FASTENER ASSEMBLIES

(71) Applicant: Enduralock, LLC, Lenexa, KS (US)

(72) Inventors: Harold Hess, Leawood, KS (US); Deeptesh Selvaraj, Pitt Meadows (CA); Igor Komsitsky, Los Angeles, CA (US); Armando Perez, Los Angeles, CA (US); Zoltan Szekely, Cypress, TX (US)

(73) Assignee: Enduralock, LLC, Lenexa, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/435,701

(22) Filed: Feb. 7, 2024

(65) Prior Publication Data

US 2024/0218901 A1    Jul. 4, 2024

Related U.S. Application Data

(63) Continuation of application No. 17/582,686, filed on Jan. 24, 2022, now Pat. No. 11,933,340.

(60) Provisional application No. 63/140,696, filed on Jan. 22, 2021.

(51) Int. Cl.
  *F16B 37/04*    (2006.01)
  *F16B 37/06*    (2006.01)

(52) U.S. Cl.
  CPC .......... *F16B 37/044* (2013.01); *F16B 37/062* (2013.01)

(58) Field of Classification Search
  CPC ...... F16B 37/044; F16B 37/062; F16B 37/04; F16B 37/041

USPC ........................................................ 411/108

See application file for complete search history.

(56) References Cited

U.S. PATENT DOCUMENTS

| | | | |
|---|---|---|---|
| 2,353,252 A | 7/1944 | Leisure et al. |
| 2,385,851 A | 10/1945 | Swanstrom et al. |
| 2,737,222 A | 3/1956 | Becker et al. |
| 2,991,816 A | 7/1961 | Harbison et al. |
| 3,160,187 A | 12/1964 | Zahofiakin et al. |
| 3,219,086 A | 11/1965 | Zahodiakin et al. |

(Continued)

FOREIGN PATENT DOCUMENTS

| | | |
|---|---|---|
| CN | 109505849 A | 3/2019 |
| EP | 3032119 B1 | 2/2019 |
| KR | 20140046297 A | 4/2014 |

OTHER PUBLICATIONS

PCT International Search Report and Written Opinion, Application No. PCT/US2018/019325, dated May 2, 2018, 10 pps.

(Continued)

*Primary Examiner* — Gary W Estremsky
(74) *Attorney, Agent, or Firm* — Armstrong Teasdale LLP

(57) ABSTRACT

Fastener assemblies and nut plate assemblies for fastener assemblies include a nut defining a bore configured to receive a threaded fastener, and a lock member. The assembly has a locked configuration in which the lock member is configured to fix rotation of the threaded fastener relative to the nut and an unlocked configuration in which the threaded fastener is allowed to rotate relative to the nut. The assembly also includes a magnetic component configured to engage the lock member and switch the assembly between the locked configuration and the unlocked configuration.

19 Claims, 27 Drawing Sheets

(56) References Cited

U.S. PATENT DOCUMENTS

| | | | |
|---|---|---|---|
| 3,426,816 | A | 2/1969 | Mcintire et al. |
| 3,695,324 | A | 10/1972 | Gulistan et al. |
| 4,191,236 | A | 3/1980 | Duran |
| 4,227,561 | A | 10/1980 | Molina |
| 4,692,075 | A | 9/1987 | Metz |
| 4,863,326 | A | 9/1989 | Vickers |
| 4,875,816 | A | 10/1989 | Peterson |
| 4,917,553 | A | 4/1990 | Muller |
| 5,082,406 | A | 1/1992 | Cosenza |
| 5,146,668 | A | 9/1992 | Gulistan |
| 5,489,173 | A | 2/1996 | Hofle |
| 5,716,178 | A | 2/1998 | Vu |
| 5,730,540 | A | 3/1998 | Duran et al. |
| 6,183,180 | B1 | 2/2001 | Copple et al. |
| 7,544,028 | B2 | 6/2009 | Tournier et al. |
| 7,614,602 | B2 * | 11/2009 | Hutter, III ............... H02G 3/30 411/533 |
| 7,698,798 | B2 | 4/2010 | Toosky |
| 7,802,952 | B2 | 9/2010 | Toosky et al. |
| 8,177,466 | B2 | 5/2012 | Csik et al. |
| 8,277,158 | B2 | 10/2012 | Csik et al. |
| 8,579,569 | B2 | 11/2013 | Schendel |
| 8,647,035 | B2 | 2/2014 | Bakken et al. |
| 9,033,632 | B2 | 5/2015 | Komsitsky et al. |
| 9,114,449 | B2 | 8/2015 | Ross et al. |
| 9,140,290 | B2 | 9/2015 | Damm |
| 9,360,039 | B2 | 6/2016 | Endt et al. |
| 9,435,369 | B2 | 9/2016 | Deck |
| 10,677,280 | B2 | 6/2020 | Hess et al. |
| 2003/0147715 | A1 | 8/2003 | Curley, Jr. et al. |
| 2009/0028660 | A1 * | 1/2009 | Csik ............... F16B 5/0208 411/103 |
| 2017/0067501 | A1 | 3/2017 | Furu-Szekely et al. |
| 2017/0175795 | A1 | 6/2017 | Hess et al. |
| 2017/0268561 | A1 | 9/2017 | Hess et al. |
| 2018/0252256 | A1 | 9/2018 | Hess et al. |

OTHER PUBLICATIONS

International Search Report and Written opinion for PCT/US 2022/013456, mailed Apr. 14, 2022, (7 pages).

* cited by examiner

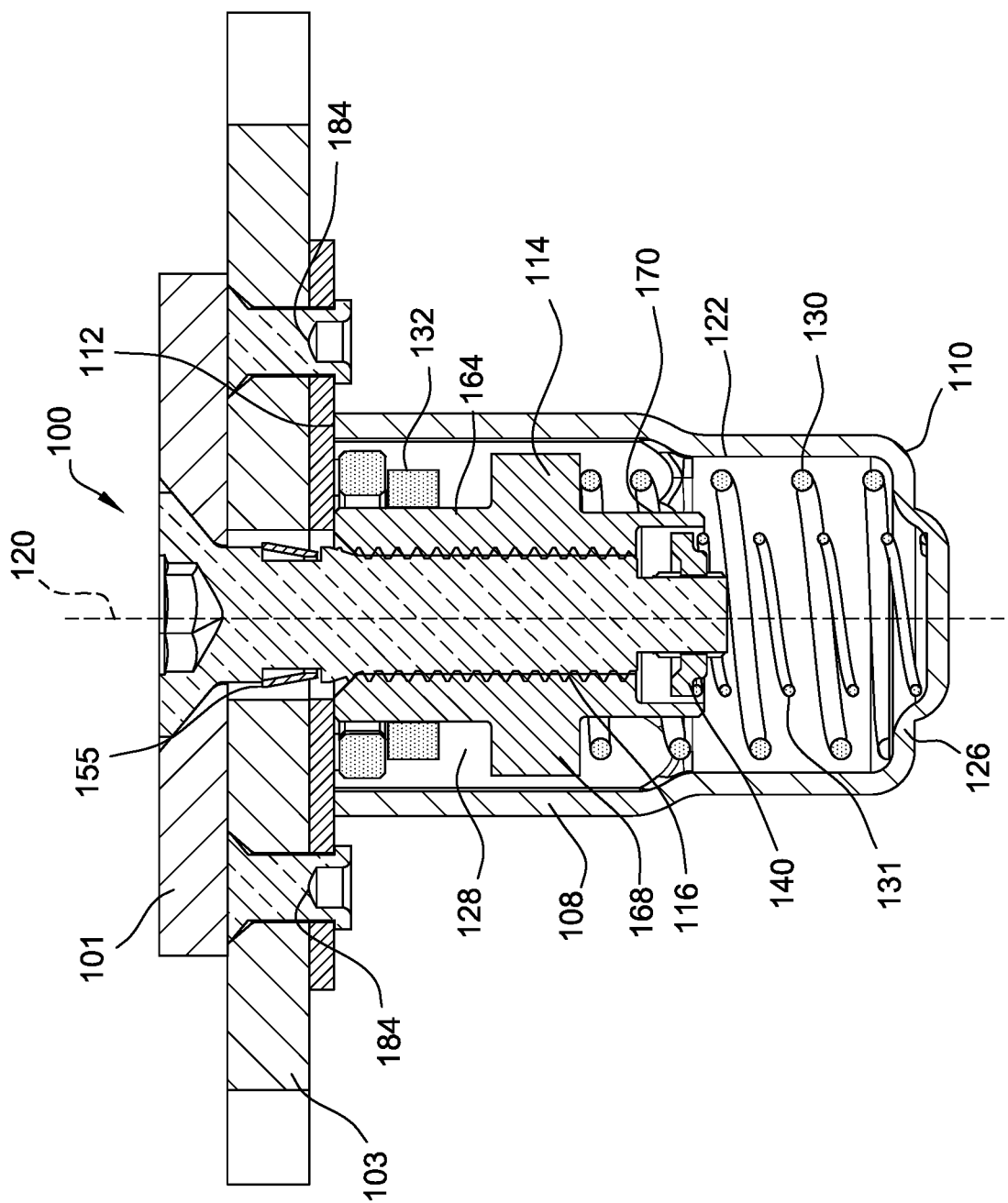

FASTENER ASSEMBLIES AND NUT PLATE ASSEMBLIES FOR FASTENER ASSEMBLIES

CROSS-REFERENCE TO RELATED APPLICATION

This application is a continuation application of U.S. Non-provisional application Ser. No. 17/582,686 filed Jan. 24, 2022, which claims priority to U.S. Provisional Application No. 63/140,696 filed Jan. 22, 2021, the contents of which are incorporated herein by reference in their entirety.

BACKGROUND

The field of the disclosure relates generally to fasteners, and more specifically to fastener assemblies including nut plate assemblies with floating nuts.

Fasteners commonly include mechanisms or design features for ensuring that fastener elements do not loosen over time, potentially allowing joined elements to loosen or separate. Examples of mechanisms include thread bore inserts and screw thread profiles that deform when tightened. Fasteners accessories like lock members, cotter pins, and lock wires are also commonly used with fasteners to prevent fastener elements from loosening. Adhesive materials, like epoxy, can be applied to fastener threads to stake fastener elements and prevent fastener elements from loosening. However, conventional fastener mechanisms, accessories, and adhesive materials may not be suitable for some applications, such as high temperature environments or with structures subject to extreme vibration.

At least some known floating nut plates include a base or bottom plate with an opening and support a nut or similar fastener element that is captured on the base by a retainer or cage component. Such nut plates facilitate holding components, for example panels, together when a fastener is threadably engaged with the nut plate and tightened, while still enabling some movement between the components. In such known nut plates, the nut receives a fastener, such as a bolt, screw, or other threaded component element passed through an opening in the components and threaded into the nut. The opening in the component may be sized to enable the nut and fastener to move laterally to accommodate some movement between the fastened components.

At least some known floating nut plates may be used in the aerospace industry. In aerospace applications, the types and numbers of fasteners for a panel assembly can be significant. Some panel fasteners for a particular panel assembly may have different lengths, while otherwise looking similar to other panel fasteners. When the panel assembly is removed, a user may typically place all the panel fasteners in a separate location to keep from misplacing the fasteners. However, when replacing the panel assembly, the user may inadvertently use an incorrect length fastener for a particular panel fastener location. This can lead to an improperly attached panel assembly.

SUMMARY

In one aspect, a fastener assembly includes a threaded fastener, a nut defining a bore configured to receive the threaded fastener, and a lock member. The fastener assembly has a locked configuration in which the lock member is configured to fix rotation of the threaded fastener relative to the nut and an unlocked configuration in which the threaded fastener is allowed to rotate relative to the nut. The fastener assembly also includes a magnetic component configured to engage the lock member and switch the fastener assembly between the locked configuration and the unlocked configuration.

In another aspect, a nut plate assembly includes a shell comprising a first end and a second end opposite the first end. The nut plate assembly also includes a floating nut disposed within the shell and defining a bore configured to receive a threaded fastener. The nut plate assembly has a locked configuration in which rotation of the threaded fastener is fixed relative to the floating nut and an unlocked configuration in which the threaded fastener is allowed to rotate relative to the floating nut. The nut plate assembly further includes a magnetic component configured to switch the nut plate assembly between the locked configuration and the unlocked configuration.

In yet another aspect, a method of assembling a fastener assembly includes positioning a floating nut within a shell member. The floating nut defines a bore configured to receive a threaded fastener. The method further includes positioning at least one magnetic component within the shell member. The at least one magnetic component is configured to switch the nut plate assembly between a locked configuration and an unlocked configuration.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 4 is a sectional view of the fastener assembly of FIG. 1;

Figure 1:
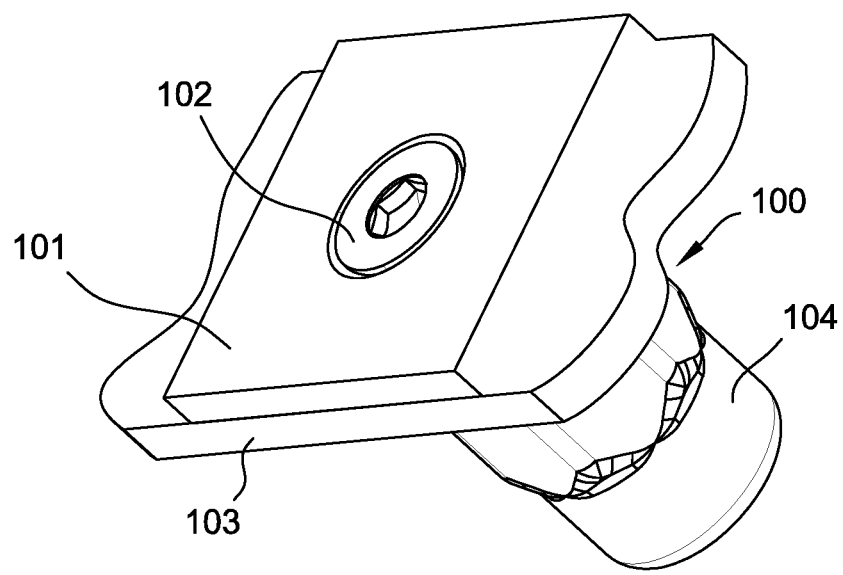
FIG. 1 is a perspective view of two components secured together by a fastener assembly.
Figure 2:
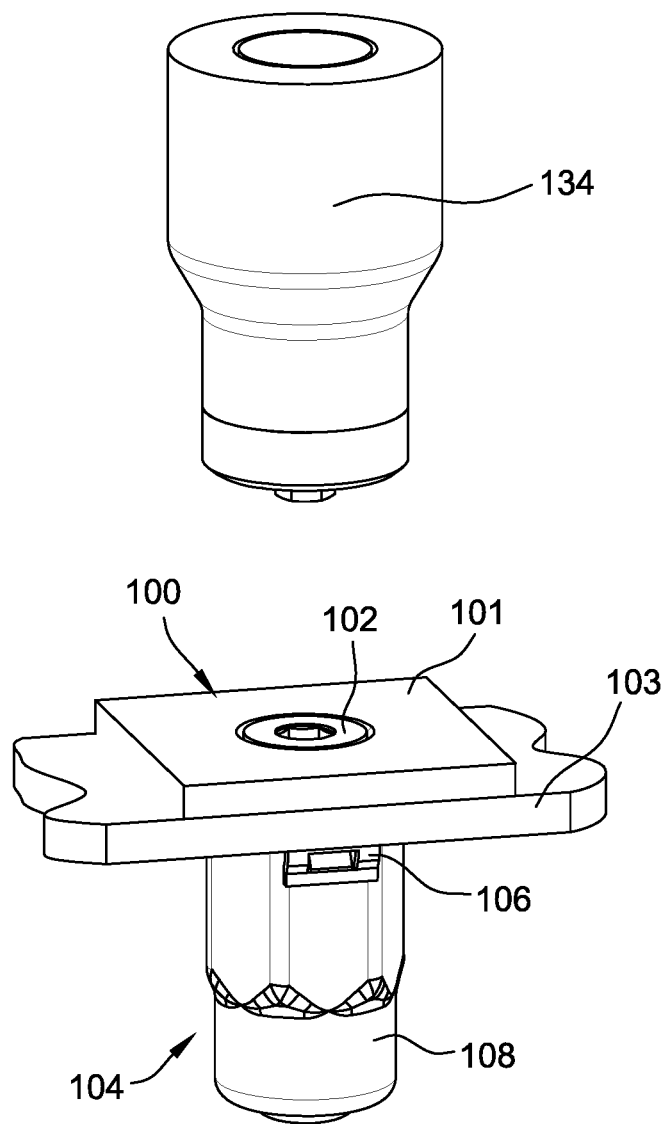
FIG. 2 is a perspective view of the fastener assembly of FIG. 1 and a tool for use with the fastener assembly.
Figure 3:
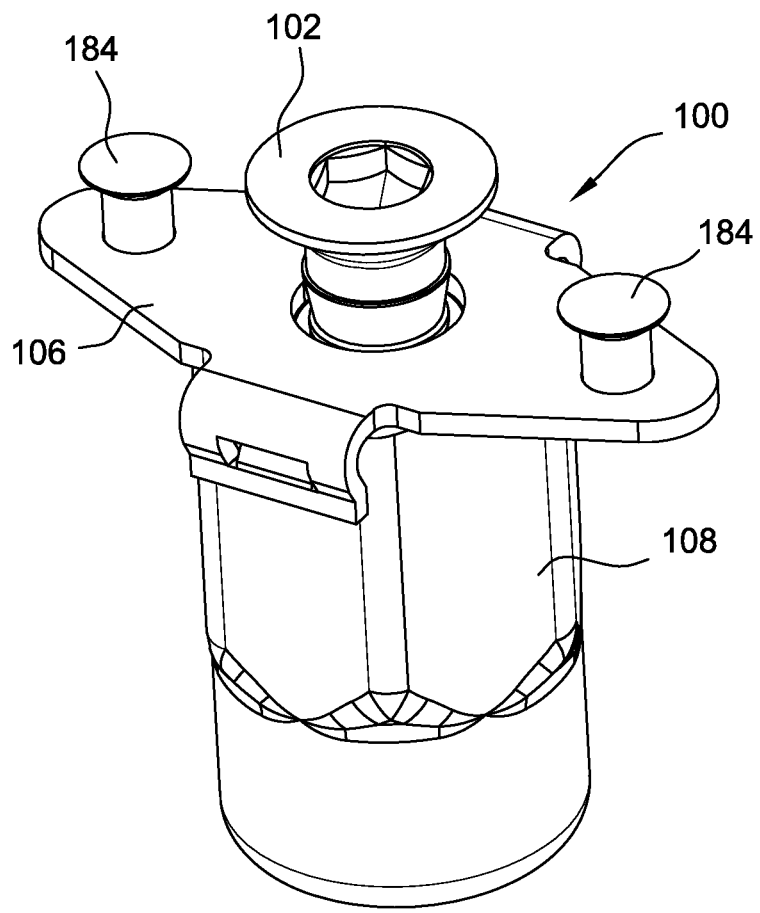
FIG. 3 is a perspective view of the fastener assembly of FIG. 1.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms such as "about," "approximately," and "substantially" are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

Relative descriptors used herein such as upward, downward, left, right, up, down, length, height, width, thickness, and the like are with reference to the figures, and not meant in a limiting sense. Additionally, the illustrated embodiments can be understood as providing exemplary features of varying detail of certain embodiments, and therefore, features, components, modules, elements, and/or aspects of the illustrations can be otherwise combined, interconnected, sequenced, separated, interchanged, positioned, and/or rearranged without materially departing from the disclosed fastener assemblies. Additionally, the shapes and sizes of components are also exemplary and can be altered without materially affecting or limiting the disclosed technology.

The fastening devices and systems described herein are typically used to fixedly connect two or more components in a variety of applications such as, and without limitation, surgical implants, industrial applications, aerospace applications, building applications, and military applications. Among other features and benefits, the disclosed fastening devices and systems can provide one or more of quick and easy installation and/or removal, and/or vibration resistant secured tightness.

The nut plate assemblies described herein overcome many of the problems associated with nut plate assemblies. In general, nut plate assemblies are used to fixedly connect panels to structures in a variety of applications such as, without limitation, aerospace applications, industrial applications, and building applications, where access to both sides of the nut plate assembly is limited or restricted. Among other features and benefits, the disclosed nut plate assemblies facilitate one or more of the use of captive panel fasteners having varying lengths, quick and easy installation and/or removal of panel fasteners, and/or single end access for blind fastening applications. The advantages, and other features of the technology disclosed herein, will become more readily apparent to those having ordinary skill in the art from the following detailed description of certain preferred embodiments taken in conjunction with the drawings.

FIG. 1 is a perspective view of two components 101, 103 secured together by a fastener assembly 100. For example, the components 101, 103 may include structures such as an aircraft access panel that is secured to an aircraft frame. The fastener assembly 100 includes a mechanically locking, self-aligning nut plate that is magnetically unlocked. The fastener assembly 100 provides a captive fastener that prevents the fastener from being lost or incorrect fasteners from being used. In addition, the fastener assembly 100 is quick and easy to install and provides tolerances for misalignment of the fastener and/or the components. Moreover, the fastener assembly 100 provides a vibration resistant securement of the components that prevents loosening when the components are exposed to extreme vibration.

With reference to FIGS. 1-9, the fastener assembly 100 includes a threaded fastener 102 and a nut plate assembly 104. The nut plate assembly 104 includes a plate member 106, a shell member 108, and a floating nut 114 disposed within the shell member and defining a bore 116 configured to receive the threaded fastener 102.

The shell member 108 includes a first end 110 coupled to the plate member, a second end 112 opposite the first end, and a sidewall 122 that extends from the first end 110 to the second end 112 along a longitudinal axis 120. In the illustrated embodiment, the sidewall 122 forms a hollow space extending along the longitudinal axis 120. The first end 110 of the shell member 108 is at least partly closed by an end wall 126 that extends radially inward from edges of the sidewall 122. In the illustrated embodiment, the first end 110 is entirely closed. The second end 112 of the shell member 108 is open. The sidewall 122 and the end wall 126 collectively define a cavity 128 sized to receive the floating nut 114.

The floating nut 114 is moveable axially within the cavity 128 of the shell member 108 along the longitudinal axis 120. In addition, the floating nut 114 has a diameter that is less than the inner diameter of the cavity 128 of the shell member 108 such that the floating nut 114 may float radially and tilt axially within the cavity to receive and engage the threaded fastener 102 even if the threaded fastener is not perfectly aligned.

Figure 5A:
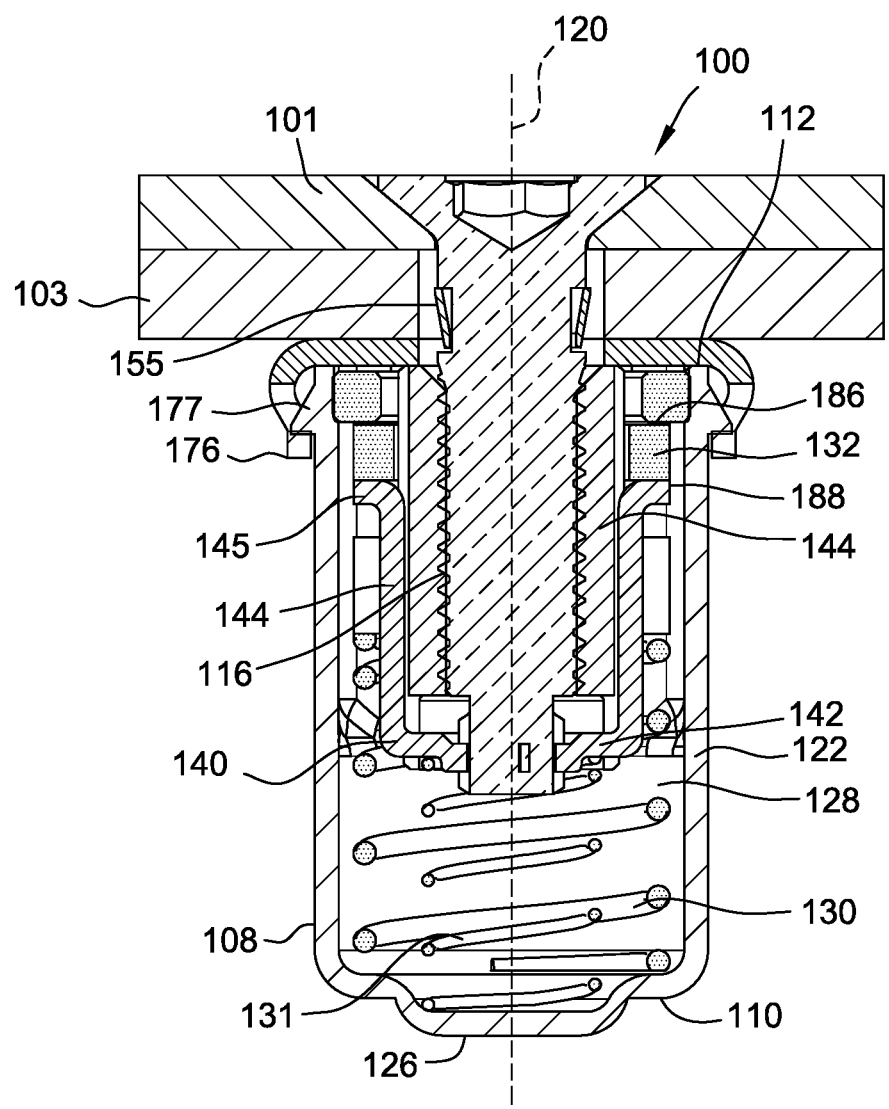
FIG. 5A is a sectional view of the fastener assembly of FIG. 1, illustrating a nut plate assembly of the fastener assembly in a locked configuration.
Figure 5B:
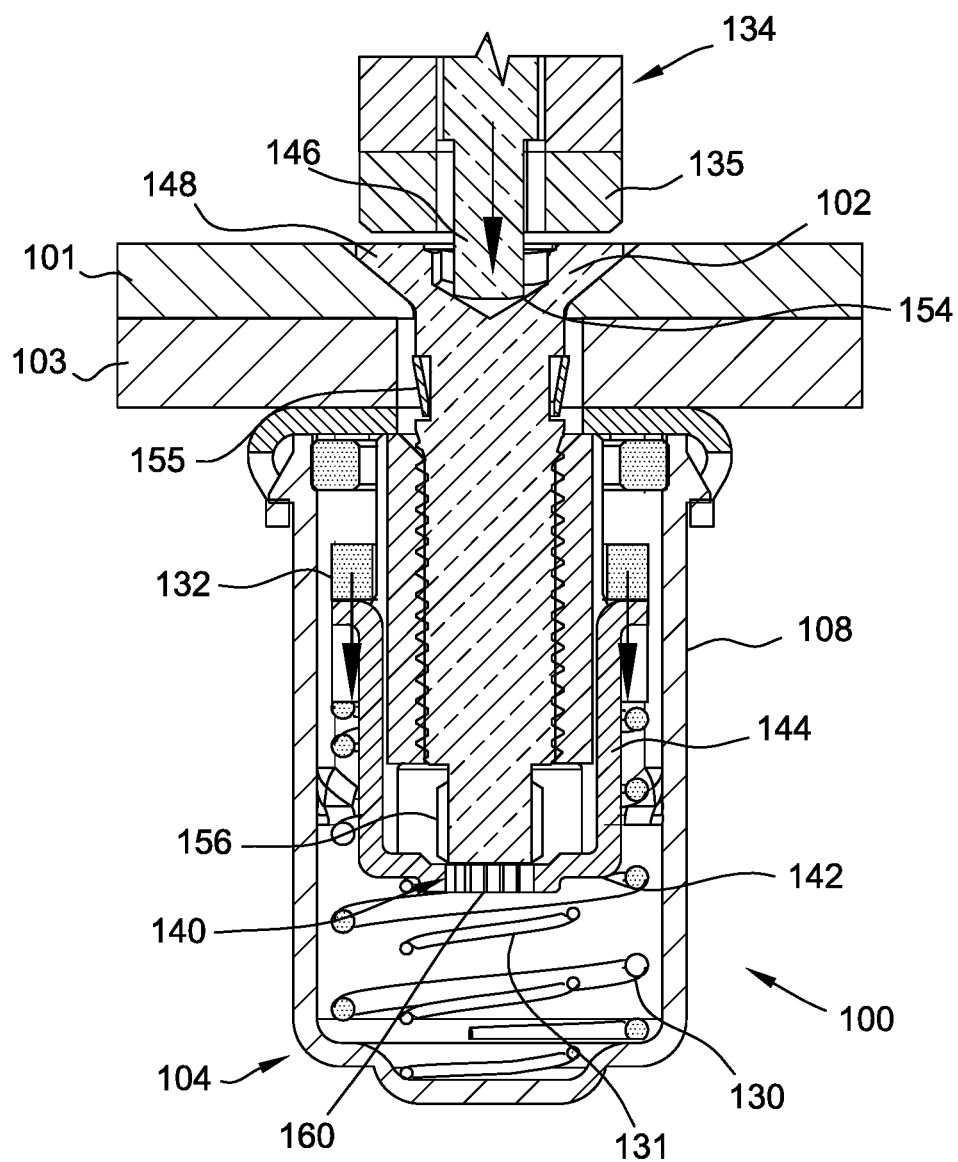
FIG. 5B is a sectional view of the fastener assembly of FIG. 1, illustrating a nut plate assembly of the fastener assembly in an unlocked configuration.

As seen in FIGS. 4, 5A, and 5B, the nut plate assembly 104 also includes a first bias member 130 and a second bias member 131 disposed within the shell member 108. The first bias member 130 is configured to bias the floating nut 114 toward the second end 112 of the shell member 108. In the illustrated embodiment, the first bias member 130 contacts and extends between the floating nut 114 and the end wall 126 of the shell member 108. Specifically, the first bias member 130 extends along and around a base 164 and a rim 170 of the floating nut 114 and contacts a shoulder or flange 168 of the floating nut. In other embodiments, the first bias member is positioned on the second end 112 and is attached to the floating nut 114 to provide a tension force and pull the floating nut toward the second end 112. The first bias member 130 centers the floating nut 114 radially within the cavity 128 and facilitates the floating nut accommodating threaded fasteners 102 that may not be perfectly aligned. For example, the nut plate assembly 104 may accommodate +/− 8° angular misalignment of the threaded fastener 102.

In the illustrated embodiment, the first bias member 130 is a helical compression spring and is constructed of a metal such as steel. Accordingly, the first bias member 130 provides a consistent bias force to the floating nut 114 and resists deformation. In embodiments, the first bias member 130 may include any elastic material such as rubber or plastic. In addition, in embodiments, the first bias member 130 may be a leaf spring or have any other suitable shape.

Figure 10:
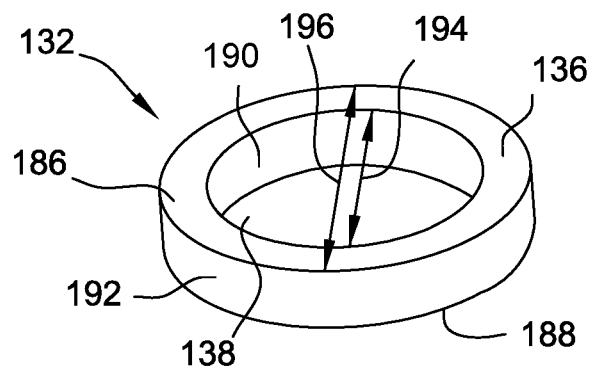
FIG. 10 is a perspective view of a magnetic member of the nut plate assembly of FIG. 7.

With reference to FIGS. 4-5B, the nut plate assembly 104 includes at least one magnetic component 132 configured to switch the nut plate assembly between a locked configuration (shown in FIGS. 4 and 5A) and an unlocked configuration (shown in FIG. 5B). For example, the magnetic component 132 is configured to interact with at least one magnet 135 on a tool 134 (shown in FIG. 5B). As shown in FIG. 10, the at least one magnetic component 132 includes a ring 136 defining an aperture 138 sized to receive the threaded fastener 102. For example, the ring 136 is constructed of a magnetic material such as a metal. In embodiments, the ring 136 is constructed as a permanent magnet that provides magnetic properties without an inducing field or current. The ring 136 is oriented for the magnetic component 132 to be repelled by the magnet 135 on the tool 134 when the tool 134 is positioned proximate to the second end 112 of the shell member 108. In other embodiments, the ring 136 is configured to be attracted to the magnet 135 on the tool 134.

Figure 9:
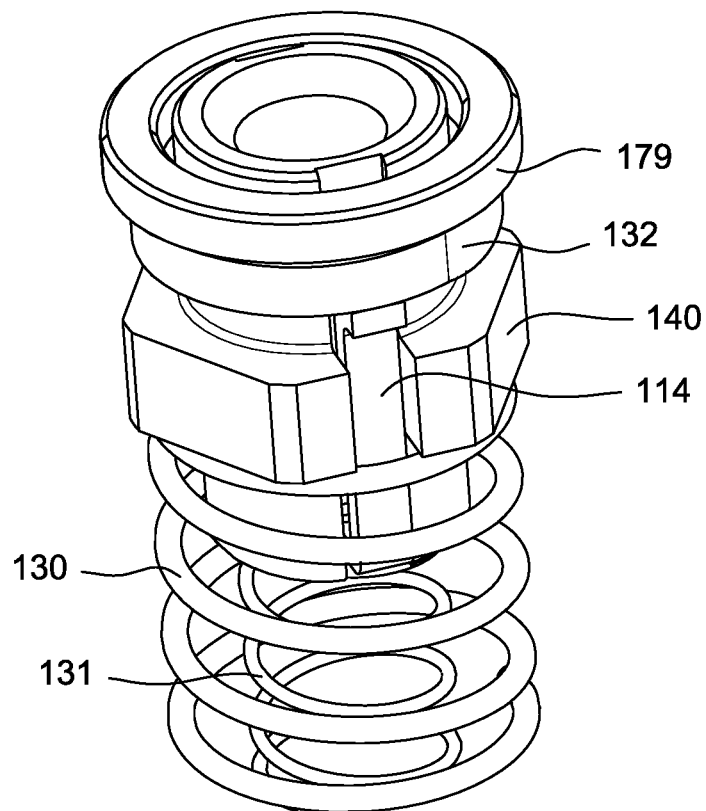
FIG. 9 is a perspective view of a portion of the nut plate assembly of FIG. 7, with a shell removed to illustrate components disposed within the shell.

As shown for example in FIG. 9, the nut plate assembly 104 includes a lock member 140 coupled to the floating nut 114. The nut plate assembly 104 has a locked configuration (FIG. 5A) in which the lock member 140 is configured to fix rotation of the floating nut 114 relative to the threaded fastener 102 and an unlocked configuration (FIG. 5B) in which the threaded fastener is allowed to rotate relative to the floating nut. The lock member 140 is configured to engage the at least one magnetic component 132. For example, the lock member 140 includes a base 142 and a pair of lock arms 144 extending axially from the base. The pair of lock arms 144 are configured to extend along an outer surface of the floating nut 114 and engage the at least one magnetic component 132. The magnetic component 132 is configured to move the lock member 140 axially to switch the nut plate assembly 104 between the locked configuration and the unlocked configuration when the magnetic component interacts with the magnet 135 on the tool 134. In some embodiments, the magnetic component 132 and the lock member 140 are formed as a single piece, joined together, mechanically attached to each other, or otherwise coupled together.

The second bias member 131 is configured to bias the lock member 140 toward the threaded fastener 102 and the second end 112 of the shell member 108. In the illustrated embodiment, the second bias member 131 contacts and extends between the lock member 140 and the end wall 126 of the shell member 108. In the illustrated embodiment, the end wall 126 includes a central recess that is arranged to receive the second bias member 131. The second bias member 131 has a smaller diameter than the first bias member 130 and is positioned concentrically with the first bias member 130. The second bias member 131 maintains the lock member 140 in position to engage the threaded fastener 102 when the nut plate assembly 104 is in the locked configuration.

In the illustrated embodiment, the second bias member 131 is a helical compression spring and is constructed of a metal such as steel. Accordingly, the second bias member 131 provides a consistent bias force to the lock member 140 and resists deformation. In embodiments, the second bias member 131 may include any elastic material such as rubber or plastic. In addition, the second bias member 131 may be a leaf spring or have any other suitable shape.

With reference to FIG. 5B, the tool 134 is configured to engage and rotate the threaded fastener 102 when the nut plate assembly 104 is in the unlocked configuration. For example, the tool 134 includes a head 146 that engages a recess in a head 148 of the threaded fastener 102. The tool 134 includes at least one magnet 135 that is configured to interact with the at least one magnetic component 132 within the shell member 108 to switch the nut plate assembly 104 between the locked configuration and the unlocked configuration when the tool 134 engages the threaded fastener 102. For example, in the illustrated embodiment, the magnet 135 extends around the head 146 of the tool 134 and is positioned proximate the nut plate assembly 104 when the head engages the threaded fastener 102.

Figure 6:
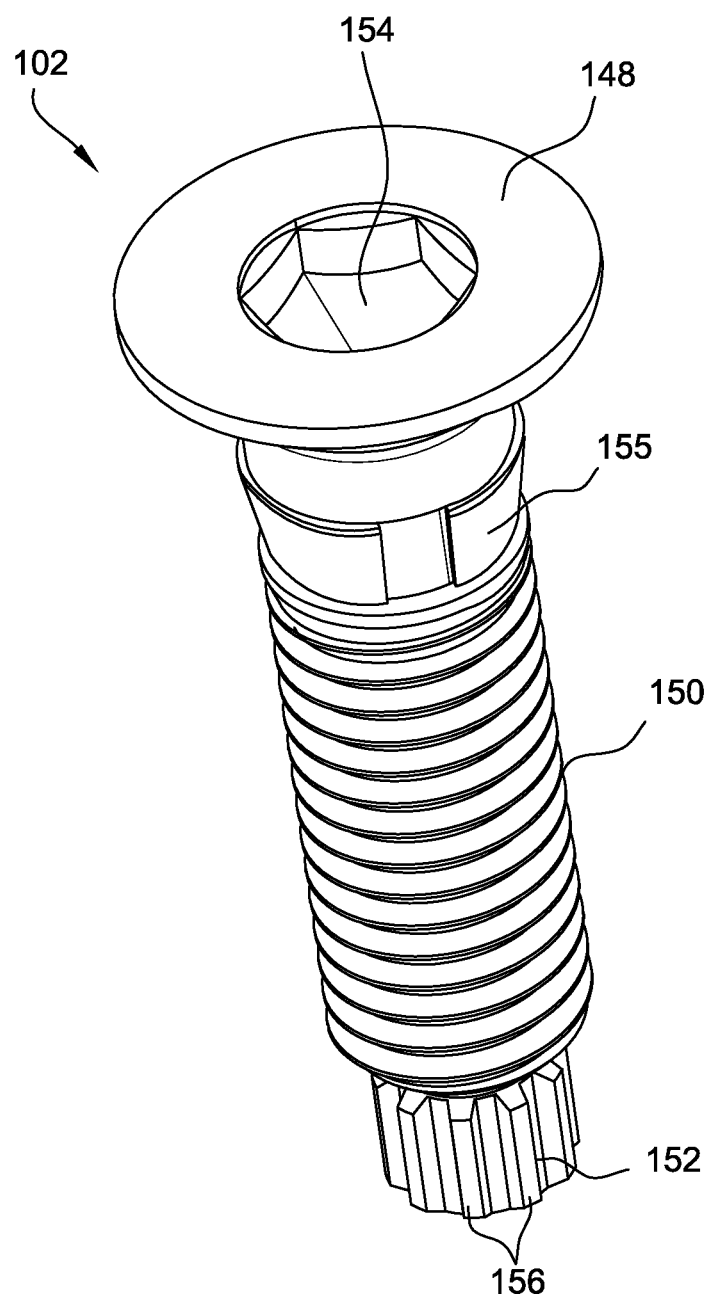
FIG. 6 is a perspective view of a threaded fastener of the fastener assembly of FIG. 1.

FIG. 6 is a perspective view of the threaded fastener 102. The threaded fastener 102 includes the head 148, a threaded body 150 extending longitudinally from the head, and a tip 152 on an end of the threaded body opposite the head. The head 148 defines a recess 154 that is sized and shaped to engage the head 146 of the tool 134 (shown in FIG. 5B). The threaded body 150 is configured to engage with the floating nut 114 through mating threads when the threaded fastener 102 is inserted into the nut plate assembly 104 and rotated using the tool 134.

In the illustrated embodiment, a retaining ring 155 is positioned on the threaded body 150 proximate the head 148. The retaining ring 155 is circular and has an inner diameter that is substantially equal to or less than the diameter of the threaded body 150. The retaining ring 155 extends circumferentially around the threaded body 150. The retaining ring 155 may be split to facilitate positioning the retaining ring 155 on the threaded body 150. The retaining ring 155 is fixed in longitudinal position on the threaded fastener 102 and is tapered outward towards the head 148 of the threaded fastener 102. The retaining ring 155 facilitates the threaded fastener being captured in openings. For example, retaining ring 155 deforms radially when the threaded fastener 102 is inserted into the opening in the component 101 (shown in FIG. 1) and then returns to an undeformed state and engages the component 101 to prevent removal of the threaded fastener 102 from the opening in the component. The retaining ring 155 is able to be fixed in longitudinal position on the threaded fastener 102 because the first bias member 130 (shown in FIG. 5B) facilitates the floating nut 114 moving axially to accommodate the captured threaded fastener 102 when the component 101 is secured/unsecured to the structure 103. To remove the threaded fastener 102 from the component, the retaining ring 155 is deformed or collapsed using a tool. The retaining ring 155 may be omitted without departing from some aspects of the disclosure.

The tip 152 of the threaded fastener 102 includes at least one tooth 156 that extends radially outward from the threaded fastener and is configured to engage the lock member 140 when the nut plate assembly 104 is in the locked configuration (shown in FIG. 5A). In the illustrated embodiment, the tip 152 includes a plurality of engagement teeth 156 arranged about the circumference of the threaded fastener 102 and extending between the threaded body 150 and an end of the threaded fastener. Each engagement tooth 156 has a symmetrical, trapezoid shape in cross-section. The engagement teeth 156 are configured to prevent rotation of the threaded fastener 102 relative to the lock member 140 in the clockwise and counter-clockwise directions when the nut plate assembly 104 is in the locked configuration. For example, both lateral sides of the engagement teeth 156 include substantially planar surfaces that are shaped to engage the lock member 140 and prevent rotation. Accordingly, the fastener assembly 100 provides a more secure connection and reduces wear on locking components.

Figure 7:
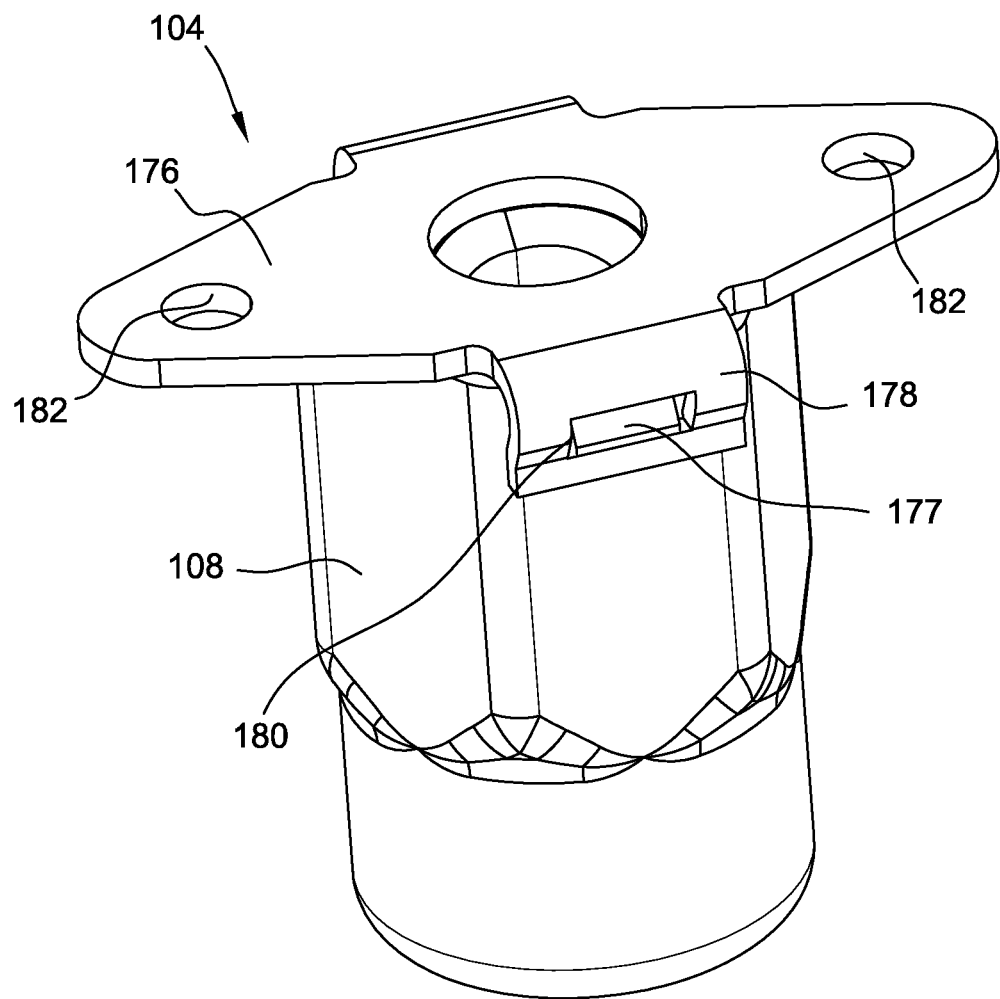
FIG. 7 is a perspective view of a nut plate assembly of the fastener assembly of FIG. 1.
Figure 8:
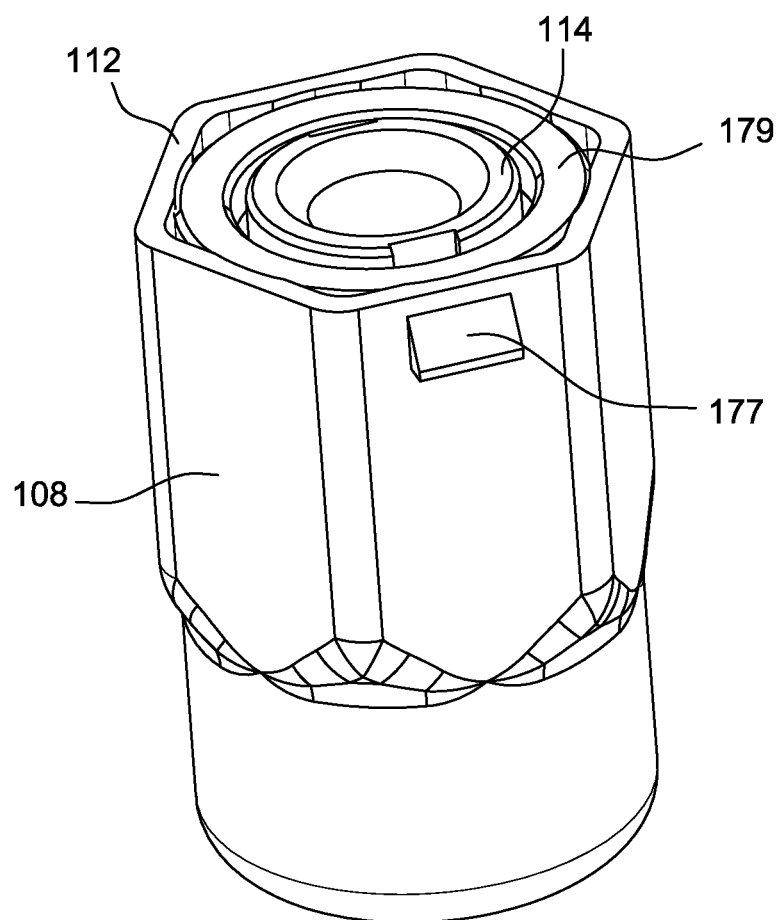
FIG. 8 is a perspective view of a portion of the nut plate assembly of FIG. 7.

As shown in FIGS. 7 and 8, the shell member 108 is removably coupled to a plate 176. For example, the plate 176 includes tabs 178 defining slots 180 that receive protuberances 177 on the shell member 108. The tabs 178 may be positionable to release the shell member 108 from the plate 176. In the illustrated embodiment, the tabs 178 are bent axially and toward the shell member 108 to engage the protuberances 177 on the shell member. In other embodiments, the plate 176 and the shell member 108 are permanently attached. For example, in some embodiments, the plate 176 and the shell member 108 are integrally formed as a single piece. In other embodiments, the plate 176 and the shell member 108 are connected by welds, fasteners, and/or any other suitable attachment means.

The plate 176 includes openings 182 to receive fasteners 184 (shown in FIGS. 3 and 4) to secure the plate 176 to the substructure 103. The fastener assembly 100 provides a captive fastener that can be secured from one side of the panel 101 when the plate 176 is secured to the side of the substructure 103.

As seen in FIG. 9, the nut plate assembly 104 may include a retainer 179 positioned at the second end 112 of the shell member 108 to retain components within the cavity of the shell member. The retainer 179 facilitates assembling the components within the shell member 108 and maintaining a position of the components. In some embodiments, the retainer 179 may be omitted and components may be retained within the cavity of the shell member 108 by, for example, the plate 176.

Referring to FIG. 10, the ring 136 includes a first annular surface 186, a second annular surface 188, an inner circumferential wall 190, and an outer circumferential wall 192. The inner circumferential wall 190 defines a first, inner diameter 194 of the ring 136. The outer circumferential wall 192 defines a second, outer diameter 196 of the ring 136. The second diameter 196 is larger than the first diameter 194. The first diameter 194 is sized to receive the floating nut 114 therein. The first annular surface 186 and the second annular surface 188 extend from the inner circumferential wall 190 to the outer circumferential wall 192. In the illustrated embodiment, the ring 136 is symmetric and can be oriented on the floating nut 114 such that the first annular surface 186 or the second annular surface 188 contact the lock member 140 (shown in FIGS. 5A and 5B).

Figure 11:
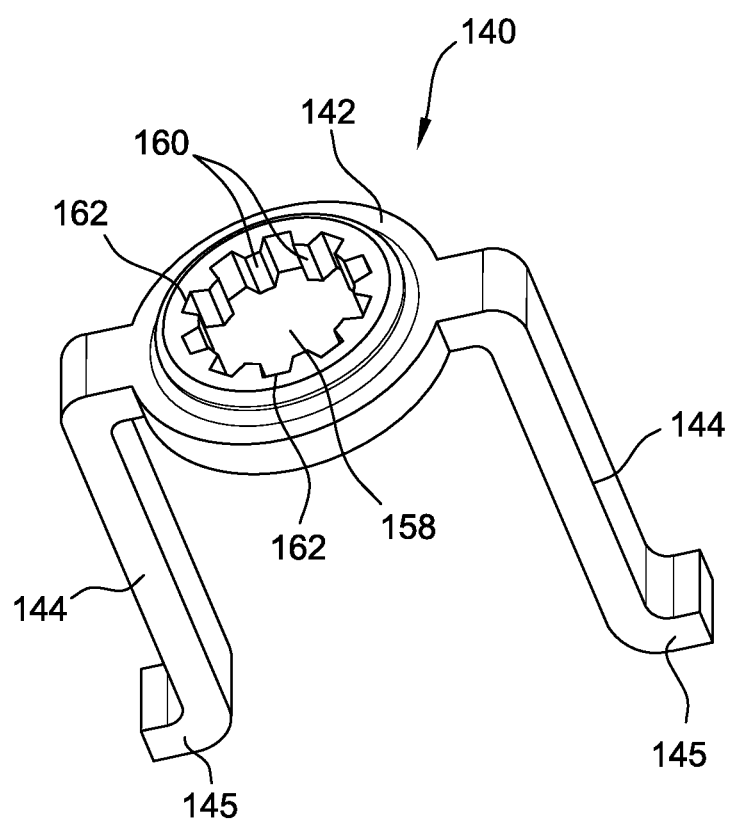
FIG. 11 is a perspective view of a lock member of the nut plate assembly of FIG. 7.

FIG. 11 is a perspective view of the lock member 140. The base 142 of the lock member 140 is a ring and defines an aperture 158 sized to receive the tip 152 of the threaded fastener 102 (shown in FIG. 6) when the nut plate assembly 104 is in the locked position. In addition, the lock member 140 includes a plurality of engagement teeth 160 extending radially inward from the base 142 and defining a plurality of notches 162 therebetween. The notches 162 are sized to receive the engagement teeth 156 of the threaded fastener 102 such that each engagement tooth 156 is positioned between and engaged by engagement teeth 160 on either side of the respective notch. The lateral sides of the engagement teeth 160 include substantially planar surfaces that are shaped to engage the engagement tooth 156. Accordingly, the engagement teeth 156 of the threaded fastener 102 and the engagement teeth 160 of the lock member 140 are configured to intermesh and prevent relative rotation in either direction when the nut plate assembly 104 is in the locked position and the threaded fastener 102 is secured to the nut plate assembly 104.

The pair of lock arms 144 extend from diametrically opposite sides of the base 142. The pair of lock arms 144 are sized and shaped to extend along the longitudinal axis of the shell member 108 and engage the at least one magnetic component 132. For example, each lock arm 144 has a length that is at least half the length of the threaded fastener 102. In addition, the lock member 140 includes a radially extending tab 145 on a distal end of each lock arm 144. The radially extending tab is arranged to engage a surface on the magnetic component 132, as shown in FIG. 9.

Figure 12:
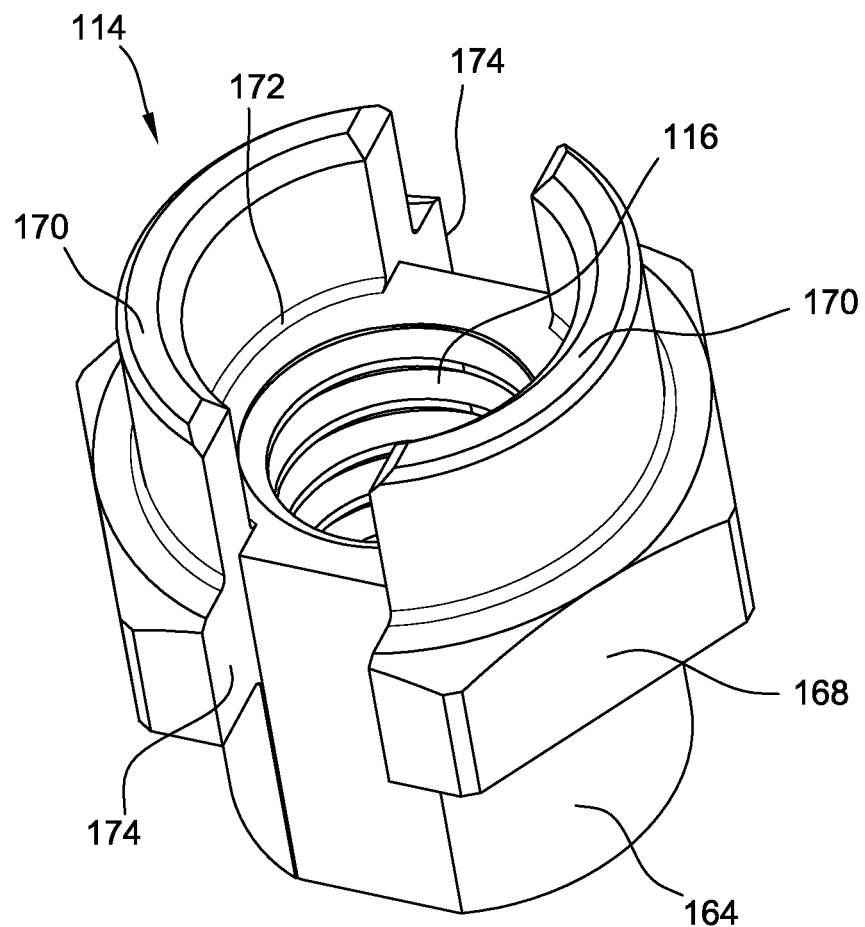
FIG. 12 is a perspective view of a floating nut of the nut plate assembly of FIG. 7.

As shown in FIG. 12, the floating nut 114 includes a base 164 defining the threaded bore 116, a flange 168 extending around the base 164, and a rim 170 extending axially from the base 164. As shown in FIG. 9, the rim 170 defines a recess 172 arranged to receive the base 142 of the lock member 140. The flange 168 defines notches 174 arranged to receive the arms 144 when the base 142 is positioned within the recess 172.

With reference to FIGS. 4-5B, in use, the nut plate assembly 104 is coupled to the substructure 103 by, for example, fastening the plate 176 to the substructure using the fasteners 184. The floating nut 114, the magnetic component 132, and the lock member 140 are positioned within the shell member 108. The threaded fastener 102 extends through openings in the components 101, 103 and is received in the floating nut 114 within the shell member 108. The tool 134 is positioned to engage the head 148 of the threaded fastener 102 and the magnet 135 on the tool interacts with the magnetic component 132 within the shell member 108 to switch the nut plate assembly 104 between the locked configuration and the unlocked configuration. The magnetic component 132 engages the lock member 140 and moves the lock member axially within the shell member 108 such that the engagement teeth 156 of the threaded fastener 102 and the engagement teeth 160 of the lock member 140 are spaced apart. The tool 134 rotates the threaded fastener 102 to tighten or loosen the threaded member when the nut plate assembly 104 is in the unlocked configuration. The tool 134 is removed from the threaded fastener 102 and the nut plate assembly 104 switches to the locked configuration. The magnetic component 132 and the lock member 140 move axially within the shell member 108 to cause the engagement teeth 156 of the threaded fastener 102 to engage the engagement teeth 160 of the lock member 140. The threaded fastener 102 is rotationally fixed relative to the floating nut 114 to prevent loosening of the fastener assembly 100 when the nut plate assembly 104 is in the locked configuration.

Figure 13:
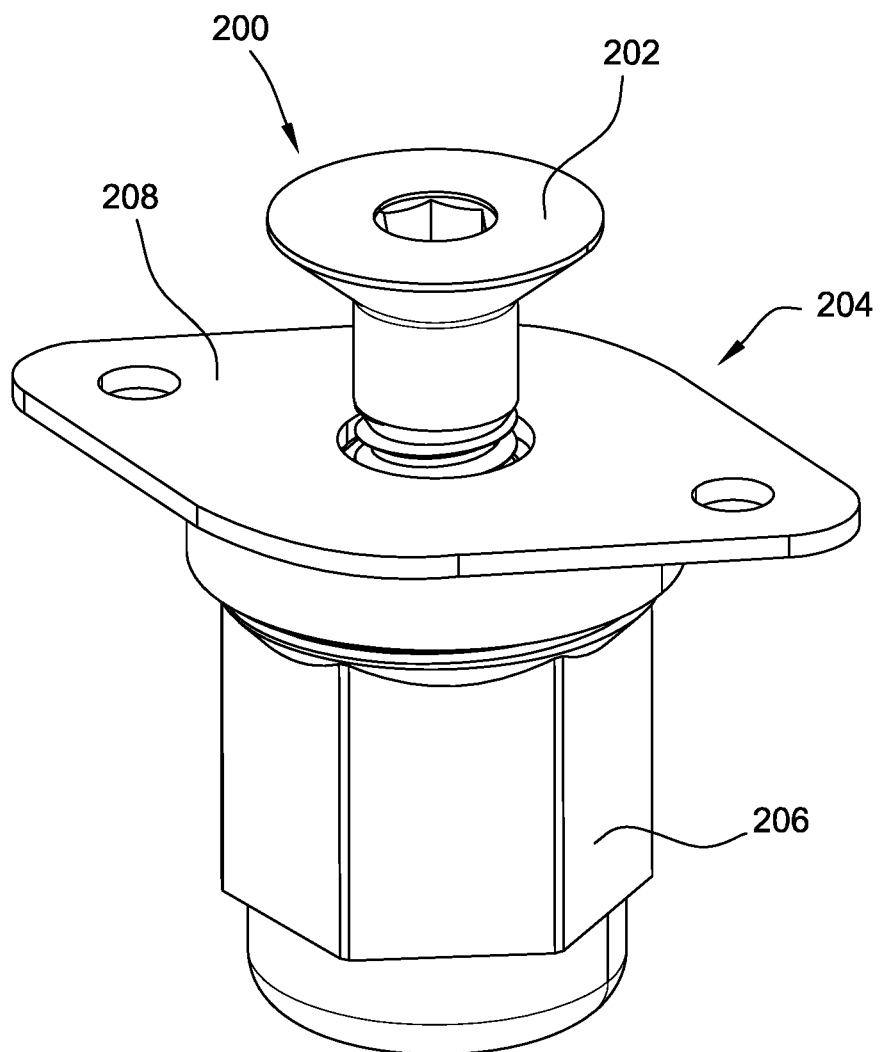
FIG. 13 is a perspective view of another embodiment of a fastener assembly, the fastener assembly including a threaded fastener and a nut plate assembly.
Figure 14:
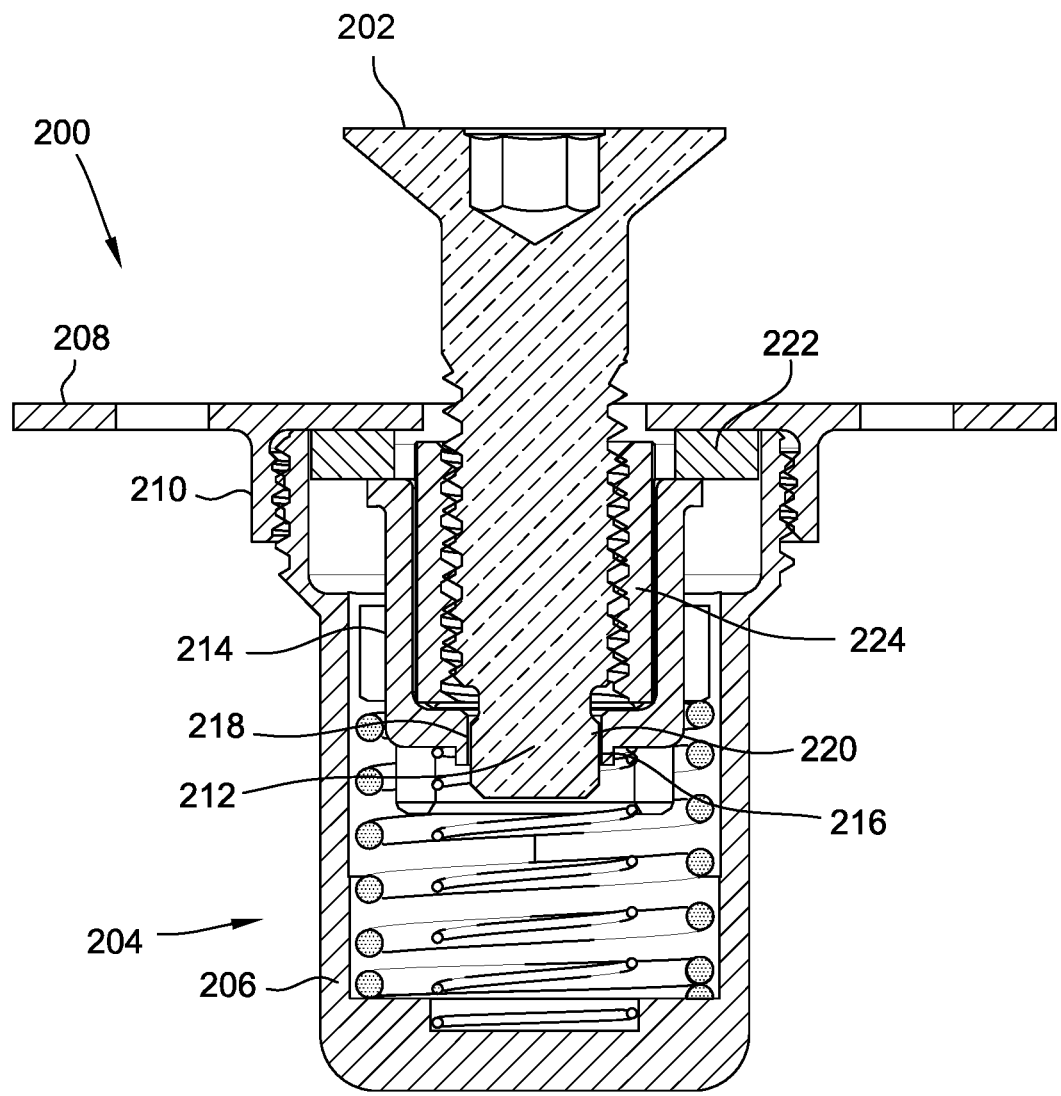
FIG. 14 is a sectional view of the fastener assembly of FIG. 13, illustrating a shell member, a lock member, and a magnetic component of the nut plate assembly.

FIGS. 13 and 14 illustrate another embodiment of a fastener assembly 200 including a threaded fastener 202 and a nut plate assembly 204. The fastener assembly 200 is similar to the fastener assembly 100 shown in FIG. 1 except as noted herein. The nut plate assembly 204 of the fastener assembly 200 includes a shell member 206 that is removably coupled to a plate 208. For example, the shell member 206 has a threaded end and the plate 208 includes an axially extending collar 210 that threadingly engages the threaded end of the shell member 206.

Figure 15:
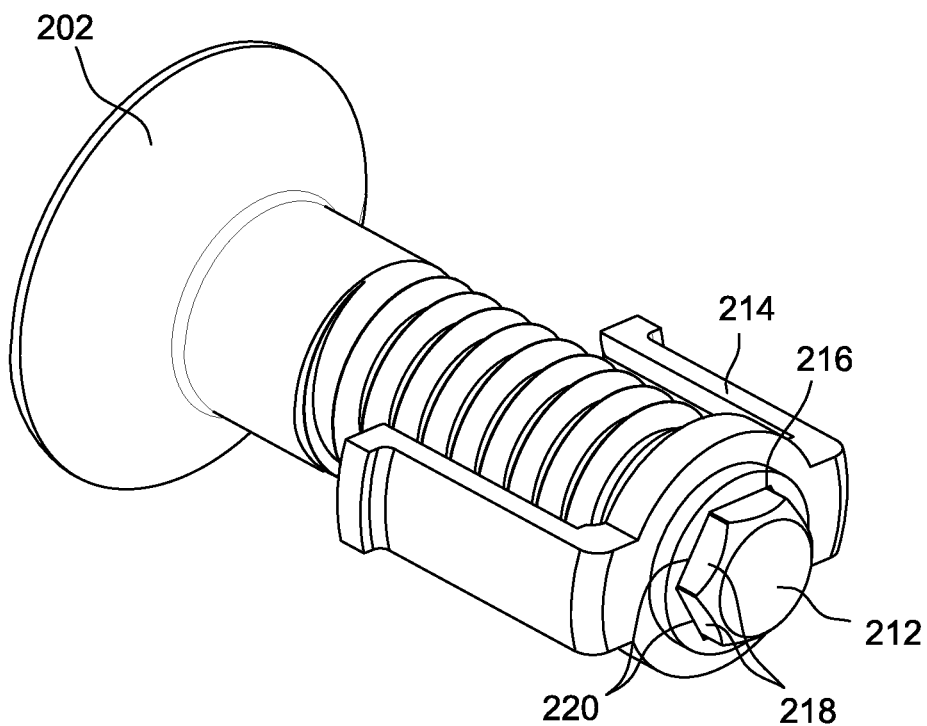
FIG. 15 is a perspective of the threaded fastener and the lock member of the fastener assembly of FIG. 13.

In addition, as shown in FIG. 15, a tip 212 of the threaded fastener 202 of the fastener assembly 200 is shaped to engage a lock member 214 without engagement teeth. For example, the tip 212 of the threaded fastener 202 has a size and shape that matches a size and shape of an opening 216 in the lock member 214. The tip 212 has axially extending planar surfaces 218 that contact and engage axially extending planar surfaces 220 on the lock member 214. In the illustrated embodiment, the tip 212 and the opening 216 are hexagonal. In other embodiments, the tip 212 and the opening 216 may be triangular, square, rectangular, octagonal, elliptical, or any other suitable shape. The threaded fastener 202 and the lock member 214 may be simpler to manufacture than members that include lock teeth and the threaded fastener 202 and the lock member 214 may be standard sizes and shapes.

Also, the fastener assembly 200 includes a magnetic component 222 that is displaceable axially within the shell member 206. The magnetic component 222 engages the lock member 214 and moves the lock member axially within the shell member 206 to switch the nut plate assembly 204 between a locked configuration and an unlocked configuration. For example, the magnet component 222 moves the lock member 214 and disengages the lock member 214 from the tip 212 of the threaded fastener 202 when the magnetic component 222 interacts with a magnet, such as the magnet 135 on tool 134 shown in FIG. 5B. In the locked configuration, the magnetic component 222 is positioned at an end of the shell member 206, and the lock member 214 engages threaded fastener 202 to prevent rotation of the threaded fastener relative to a floating nut 224 of the nut plate assembly 204.

Figure 16:
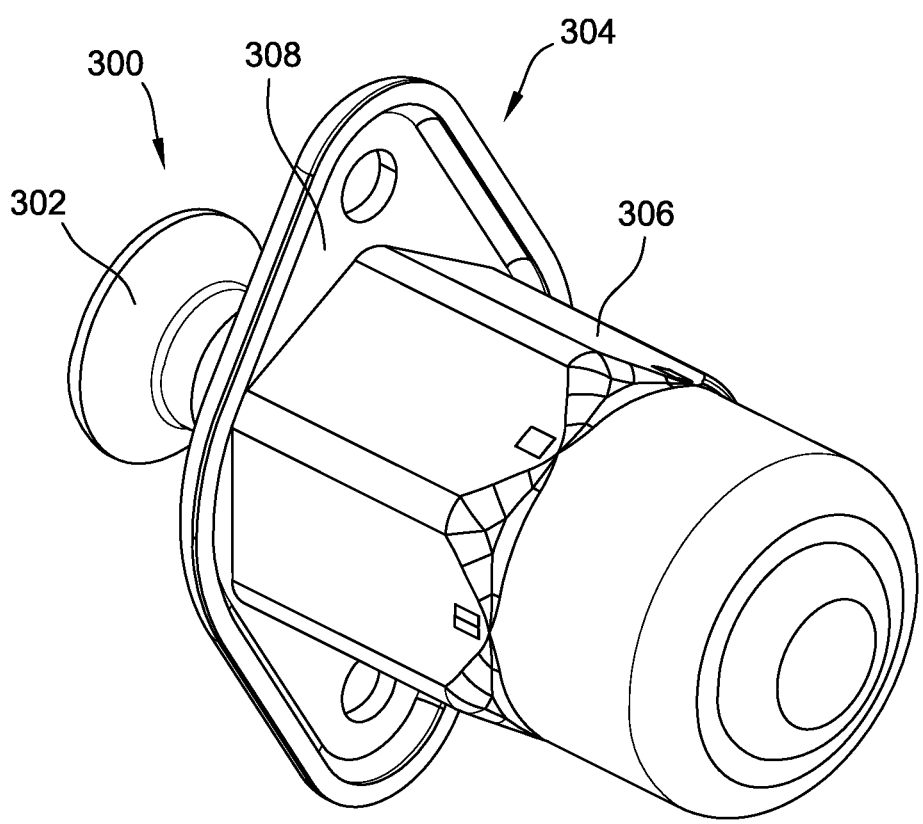
FIG. 16 is a perspective view of another embodiment of a fastener assembly, the fastener assembly including a nut plate assembly with a shell member joined to a plate.
Figure 17:
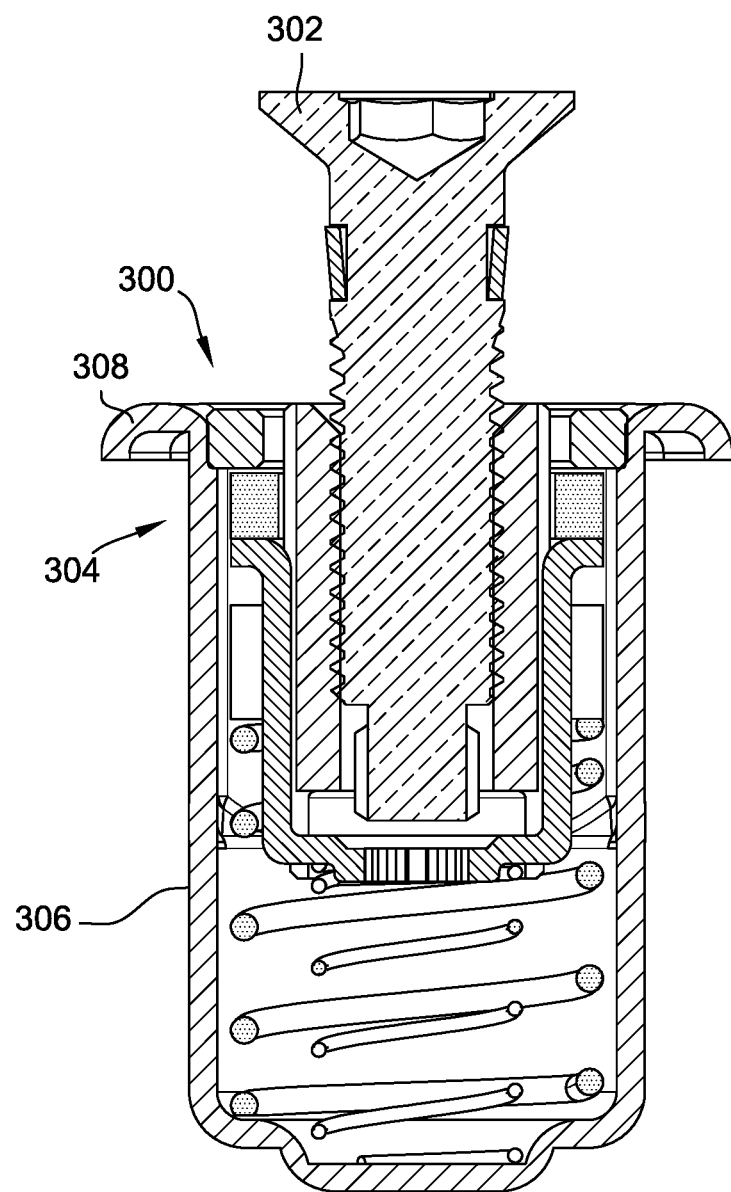
FIG. 17 is a sectional view of the fastener assembly of FIG. 13.
Figure 18:
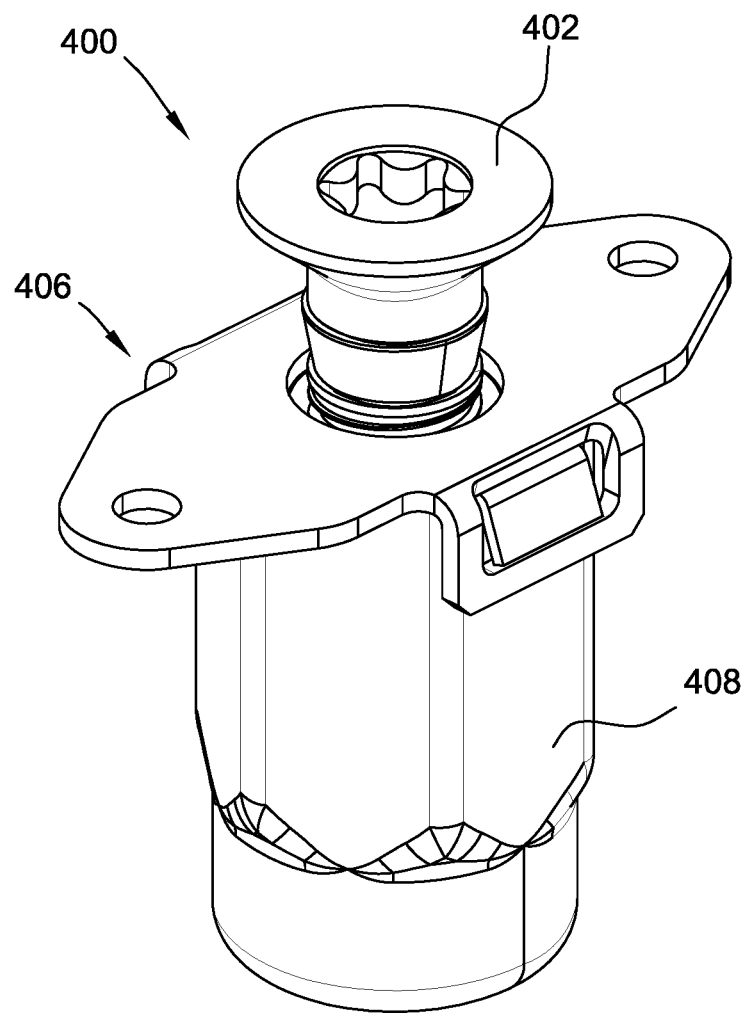
FIG. 18 is a perspective view of another embodiment of a fastener assembly.
Figure 19:
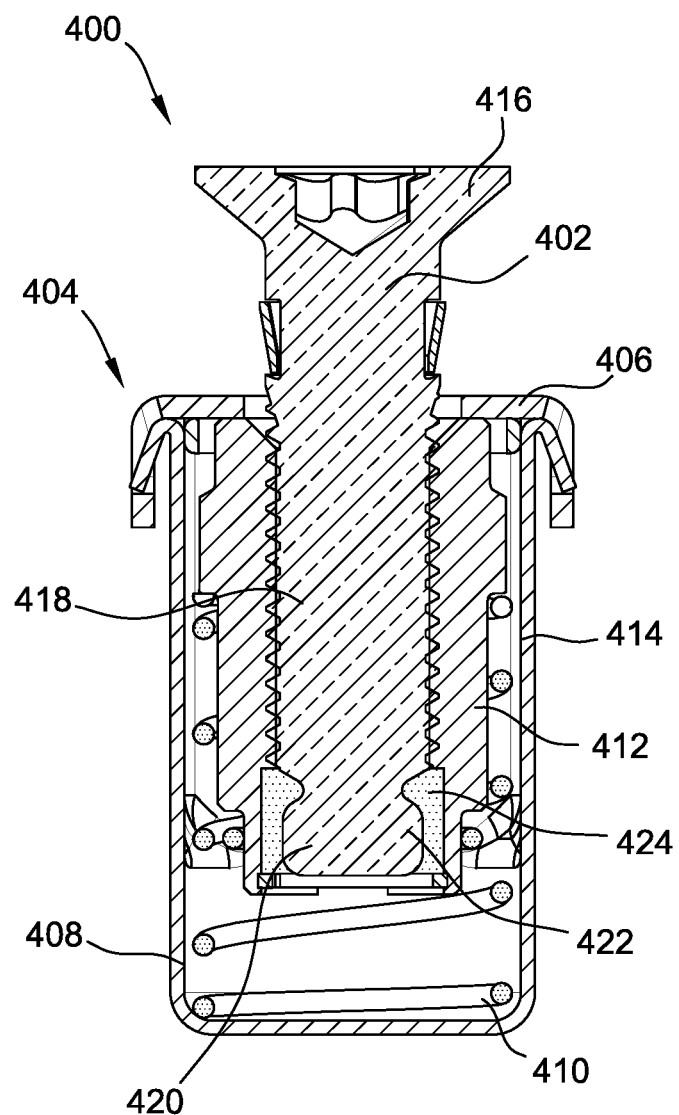
FIG. 19 is a sectional view of the fastener assembly of FIG. 18.
Figure 20:
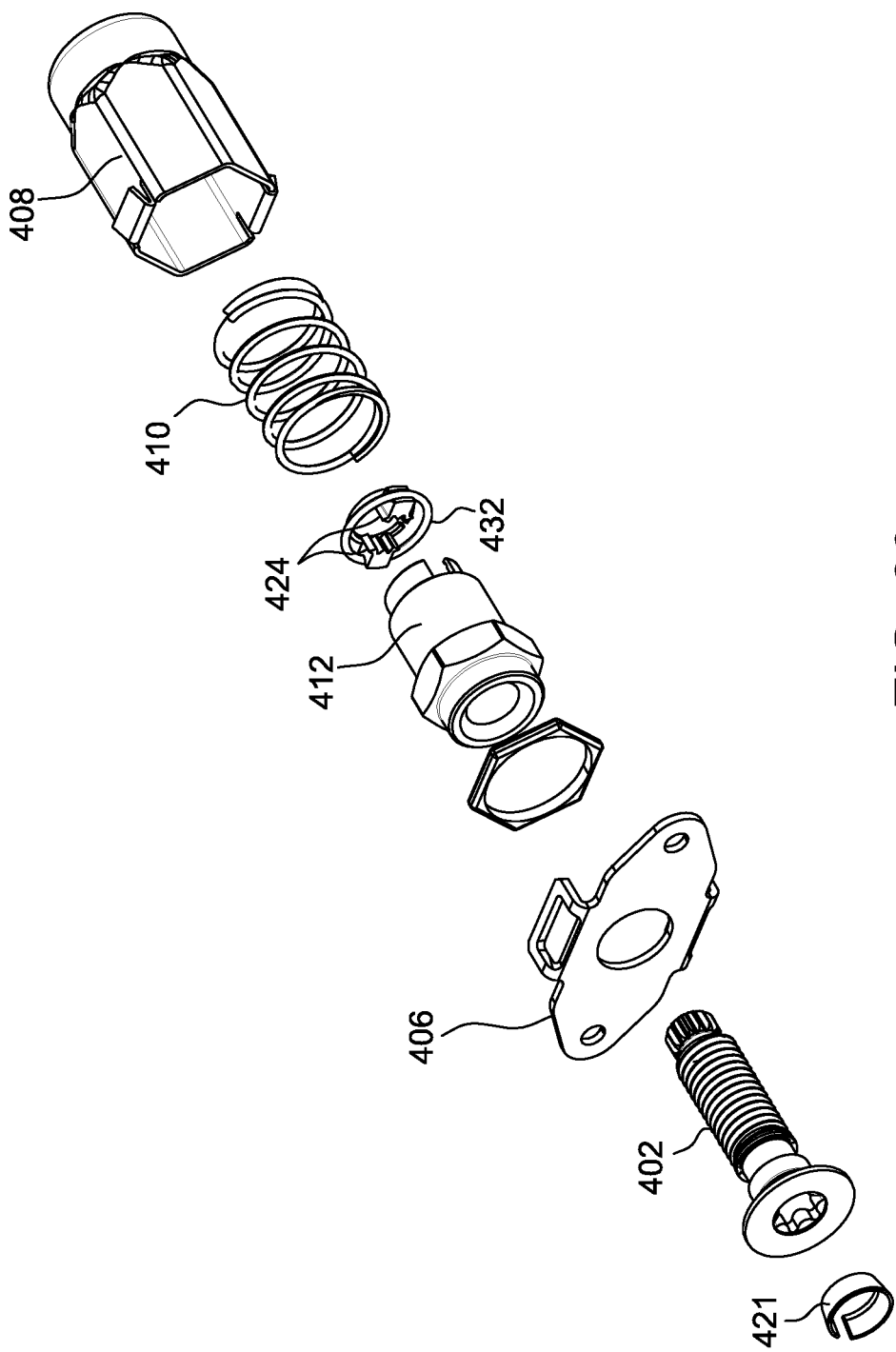
FIG. 20 is an exploded perspective view of the fastener assembly of FIG. 18.

FIGS. 16 and 17 illustrate another embodiment of a fastener assembly 300 including a threaded fastener 302 and a nut plate assembly 304. The fastener assembly 300 is similar to the fastener assembly 100 shown in FIG. 1 except as noted herein. The nut plate assembly 304 of the fastener assembly 300 includes a shell member 306 that is joined to a plate 308. For example, the shell member 306 and the plate 308 may be integrally formed as a single piece. Accordingly, the fastener assembly 300 may be simpler to assemble and more robust and resistant to failure.

Referring to FIGS. 18-21, illustrate another embodiment of a fastener assembly 400 including a threaded fastener 402 and a nut plate assembly 404. The fastener assembly 400 is similar to the fastener assembly 100 shown in FIG. 1 except as noted herein.

The nut plate assembly 404 includes a plate member 406 comprising an aperture defined therethrough, a shell member 408, a bias member 410 disposed within the shell member, and a floating nut 412 disposed within the shell member. The shell member 408 includes a wall 414 having a first end coupled to the plate member 406 and a second end opposite the first end. The wall 414 can be any suitable shape and is configured to prevent rotation of the floating nut relative to the shell member 408. In the illustrated embodiment, the shell member 408 is hexagonal in cross-section. In other embodiments, the shell member 408 is a cylinder, star-shaped, pentagon, rectangle, octagon, or any other shape.

The floating nut 412 is moveable between a first position proximate the shell member second end and a second position spaced from the shell member second end. The bias member 410 is configured to bias the floating nut toward one of the first position and the second position. In the illustrated embodiment, the bias member 410 extends between and contacts the floating nut 412 and the first end of the shell member 408 and is configured to bias the floating nut toward the second end of the shell member.

The threaded fastener 402 includes a head 416, a threaded body 418, a tip 420, and at least one fastener tooth 422 coupled to the tip 420. In the illustrated embodiment, the threaded fastener 402 includes a plurality of fastener teeth 422 spaced around the circumference of the tip 420 and extending radially outward from the tip. In the illustrated embodiment, the fastener 402 is integrally formed with the plurality of fastener teeth 422 as a single piece. In embodiments, a retainer ring 421 is positioned on the threaded fastener 402.

Figure 21:
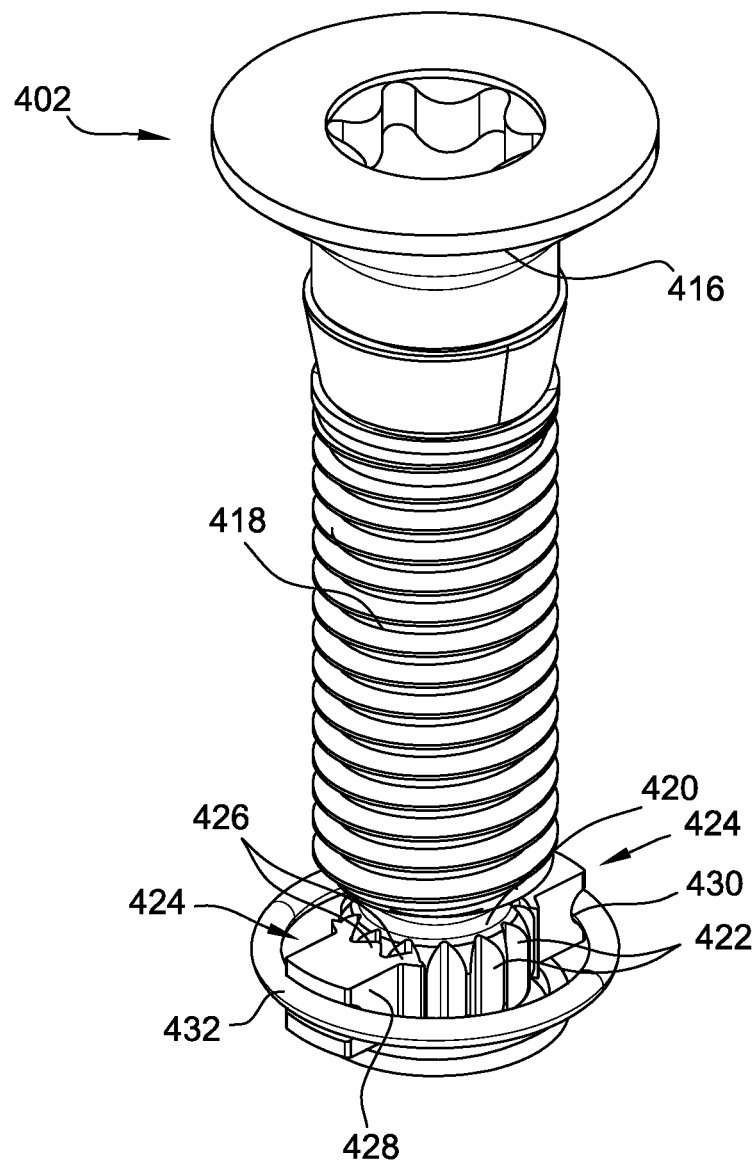
FIG. 21 is a perspective view of portion of the fastener assembly of FIG. 18, illustrating a threaded member engaged with a ratchet mechanism.
Figure 22:
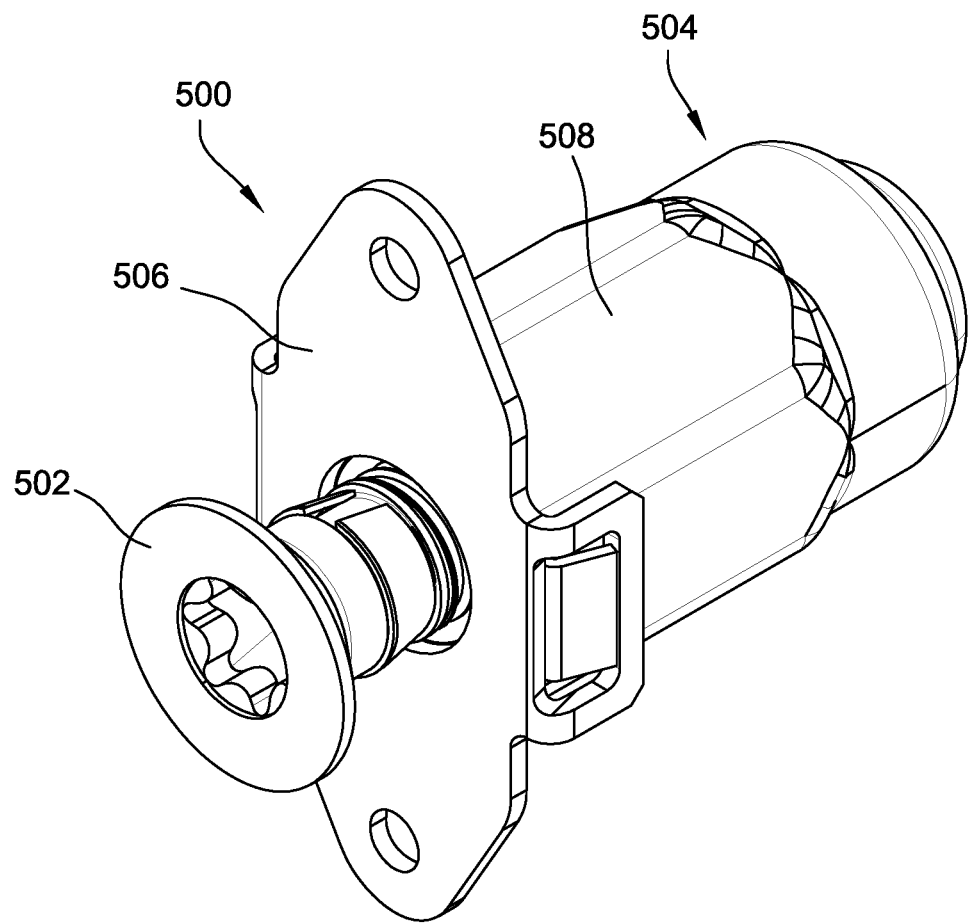
FIG. 22 is a perspective view of another embodiment of a fastener assembly.

As shown in FIG. 21, the nut plate assembly 404 also includes at least one ratchet member 424 including a plurality of ratchet teeth 426 configured to engage the at least one fastener tooth 422. For example, the nut plate assembly 404 includes a pair of ratchet members 424 with ratchet teeth 426 extending radially inward towards the fastener 402. The ratchet members 424 each include a base 428 and ratchet teeth 426 extending from the base. In addition, the base 428 defines a groove 430 on a side of the base opposite the ratchet teeth 426. The ratchet members 424 are configured to engage the fastener teeth 422 an prevent rotation of the threaded fastener in at least one direction.

The nut plate assembly 404 also includes an annular bias member 432 disposed within the shell and configured to bias the plurality of ratchet teeth 426 toward the at least one fastener tooth 422. For example, the bias member 432 can be a circular spring. The bias member 432 is received in the groove 430 on the base 428 of the ratchet members 424. The ratchet members 424, the fastener teeth 422, and the bias member 432 provide a spring-loaded ratcheting engagement that resists loosening and provides a minimum torque breakaway values.

Referring to FIGS. 22-28, another embodiment of a fastener assembly 500 includes a threaded fastener 502 and a nut plate assembly 504. The fastener assembly 500 is similar to the fastener assembly 100 shown in FIG. 1 except as noted herein.

The fastener assembly 500 includes a threaded fastener 502 configured to mount in an aperture formed in a panel member (e.g., panel member 101 shown in FIG. 1) and a nut plate assembly 504 adapted for mounting to a mounting structure (e.g., mounting structure 103 shown in FIG. 1). The nut plate assembly 504 includes a plate member 506, a shell member 508 comprising a first end coupled to the plate member and a second end opposite the first end, and a floating nut 510 disposed within the shell member. In addition, the nut plate assembly 504 includes a ratchet member 516 disposed within the shell member 508 and configured for conjoint rotation with the fastener 502. The floating nut 510 is threadably engageable with the fastener 502 for coupling the panel member to the mounting structure. The floating nut 510 is moveable between a first position proximate the shell member second end and a second position spaced from the shell member second end.

Figure 23:
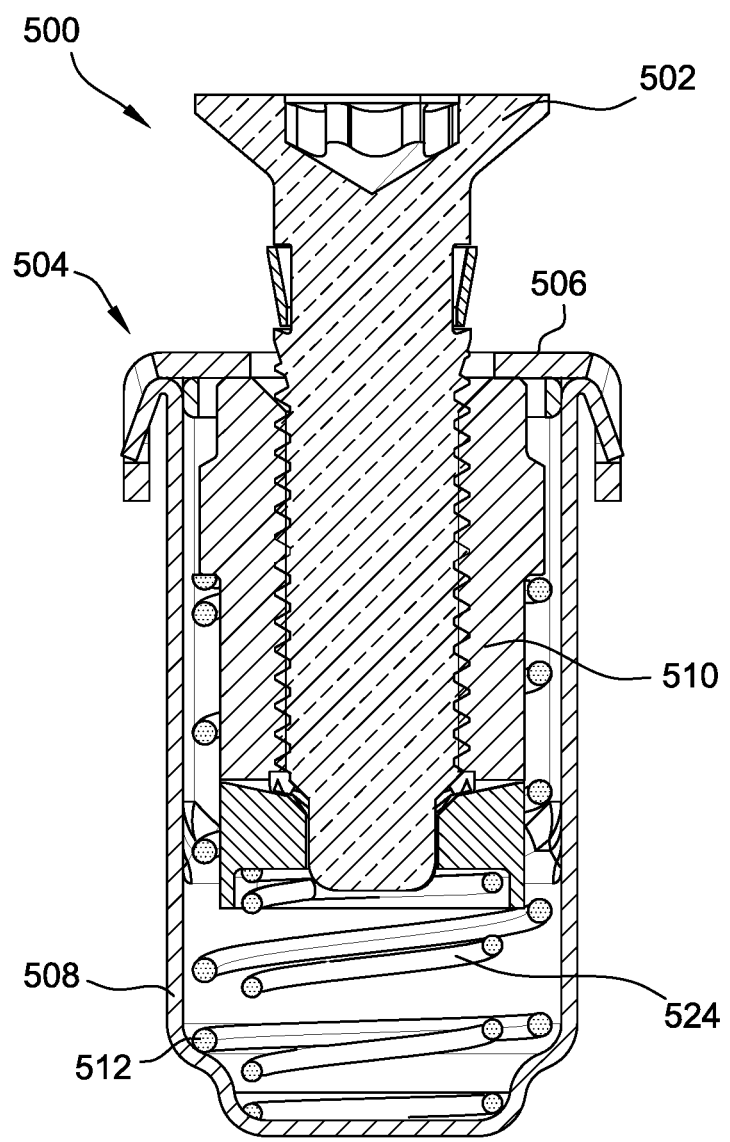
FIG. 23 is a sectional view of the fastener assembly of FIG. 22.
Figure 24:
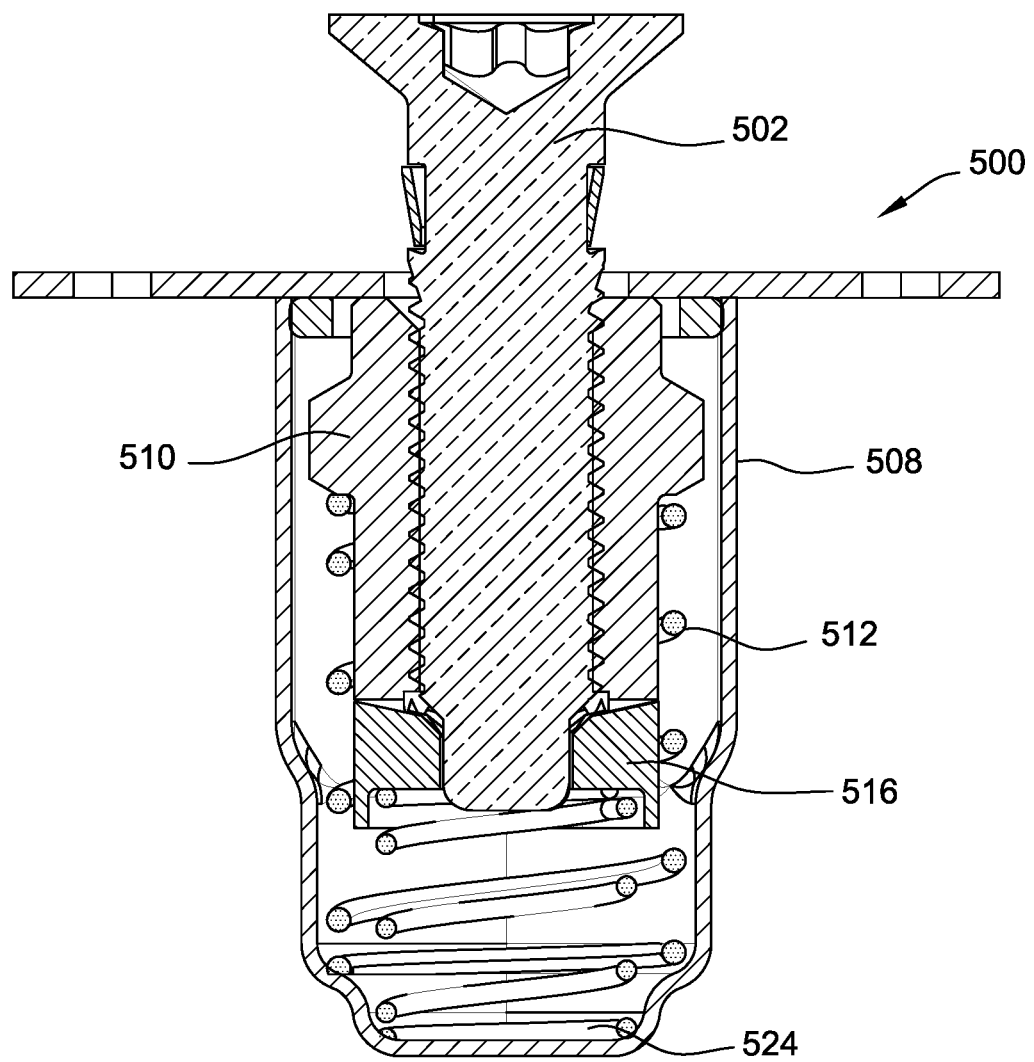
FIG. 24 is another sectional view of the fastener assembly of FIG. 22.
Figure 25:
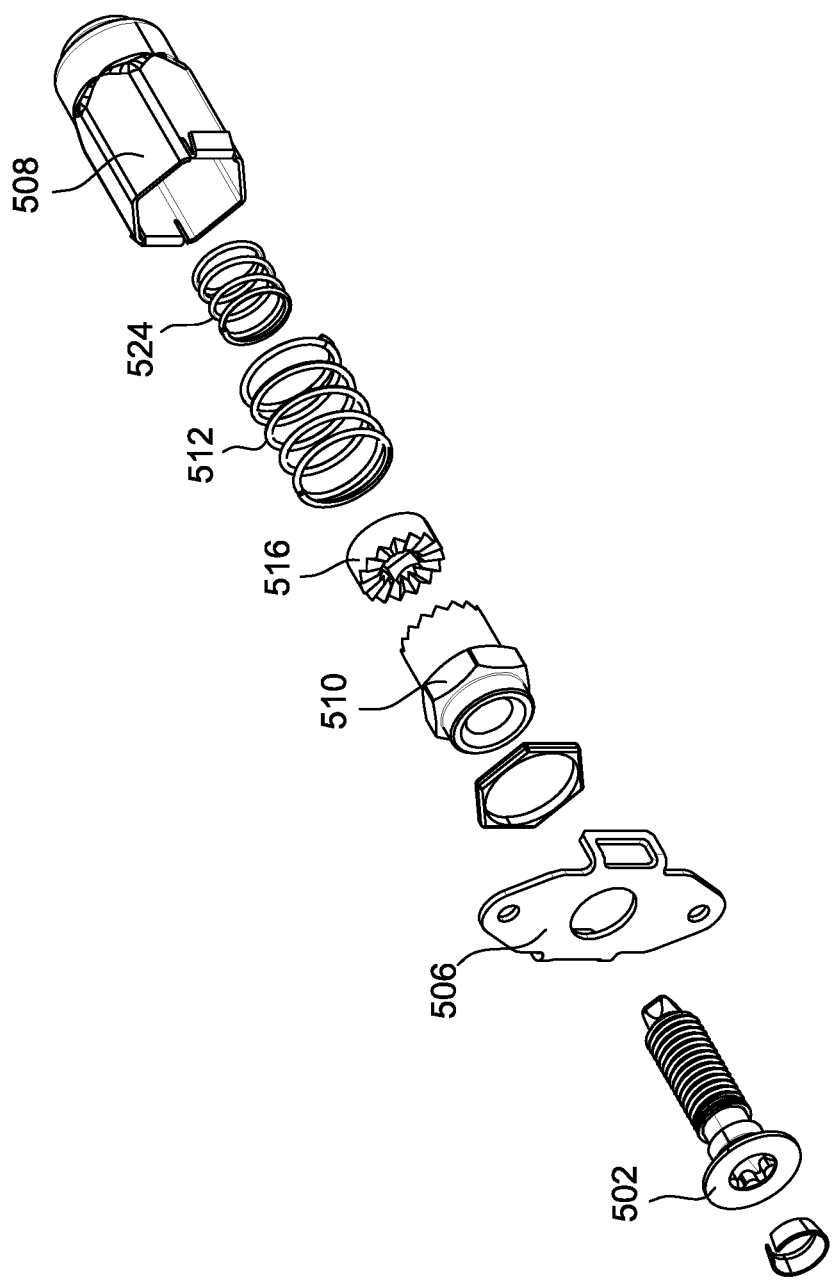
FIG. 25 is an exploded perspective view of the fastener assembly of FIG. 22.

Referring to FIGS. 23-25, the nut plate assembly 504 includes a first bias member 512 disposed within the shell member 508. The first bias member 512 is configured to bias the floating nut 510 toward one of the first position and the second position.

Figure 26:
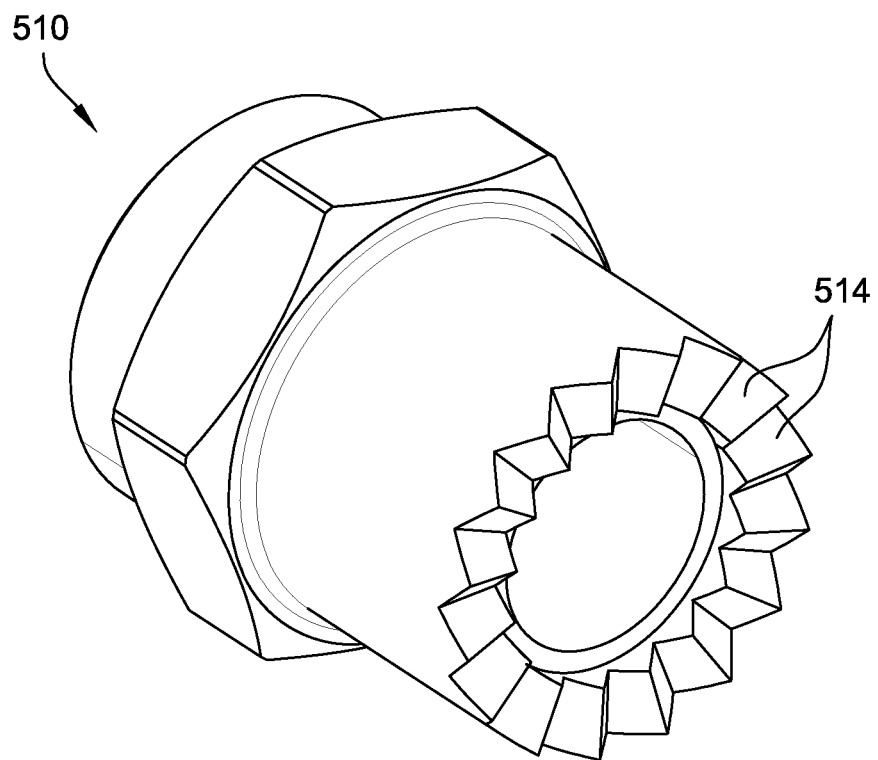
FIG. 26 is a perspective view of a floating nut of the fastener assembly of FIG. 22.

As seen in FIG. 26, the nut plate assembly 504 also includes at least one lock tooth 514 coupled to the floating nut 510. In the illustrated embodiment, the lock teeth 514 and the floating nut 510 are a single piece. The lock teeth 514 extend axially from an end of the floating nut 510.

Figure 27:
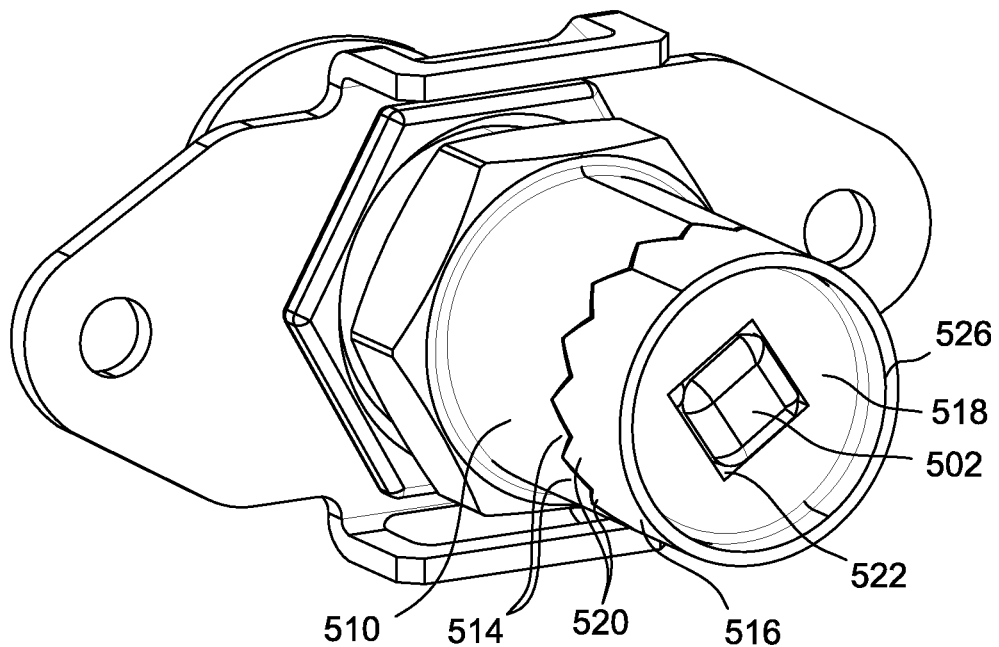
FIG. 27 is a perspective view of a portion of the fastener assembly of FIG. 22, illustrating the fastener assembly in a locked configuration.
Figure 28:
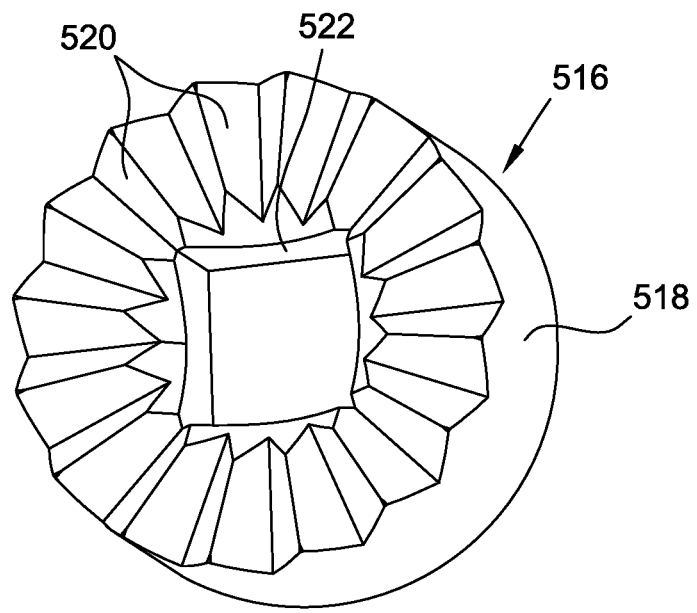
FIG. 28 is a perspective view of a lock member of the fastener assembly of FIG. 22.

With reference to FIGS. 27 and 28, the ratchet member 516 includes an annular body 518 and at least one ratchet tooth 520 configured to engage the at least one lock tooth 514 of the floating nut 510. The ratchet teeth 520 extend axially from an end of the body 518 of the ratchet member 516. In the illustrated embodiment, the ratchet teeth 520 are triangular.

Also, the body 518 of the ratchet member 516 defines an aperture 522 sized and shaped to receive the threaded fastener 502 and prevent relative rotation between the ratchet member 516 and the threaded fastener. For example, in the illustrated embodiment, the aperture 522 is square.

The nut plate assembly 504 includes a second bias member 524 disposed within the shell member 508 and configured to bias the ratchet member 516 toward the at least one lock tooth 514. In the illustrated embodiment, the ratchet member 516 includes a collar 526 extending from an end of the body 518 opposite the ratchet teeth 520 and arranged to receive the second bias member 524. The second bias member 524 facilitates engagement of the ratchet member 516 and the floating nut 510 and provides a spring-loaded ratcheting element with minimum break away torque values.

In some embodiments, a method of securing a fastener assembly generally includes positioning a threaded member through an aperture in a nut plate and threadingly engaging the threaded member within a threaded bore of a floating nut. The floating nut is biased to provide some tolerance for misalignment of the threaded member. The nut plate assembly includes at least one lock member. For example, the lock member may include at least one magnetic component or any other suitable lock member. The threaded member may be tightened relative to the lock member using a tool that positions the nut plate assembly to an unlocked configuration. When the tool is disengaged, the lock member secures the nut plate assembly in the locked configuration and the fastener assembly is inhibited from loosening.

In some embodiments, a nut plate assembly includes a ratchet member that is configured to engage fastener teeth and secure the fastener in position. Also, in some embodiments, the nut plate assembly includes a second bias member that is configured to bias the ratchet member or lock member toward engagement with the fastener teeth.

The components as described herein provide spring-loaded nut plate assemblies. For example, as described in the embodiments herein, a floating nut of the nut plate assemblies is biased by a bias member, which enables the use of captive panel screws. This facilitates ease of assembly and disassembly of a panel to an underlying structure. In addition, the spring-loaded nut plate assemblies facilitate varying length captive panel fasteners. The bias member facilitates one of pulling the structure components together or pushing them apart during assembly or removal of the panel structure. In addition, the bias member facilitates preventing damage to the internal threads of the floating nut during installation of the fastener.

Technical advantages of the embodiments described herein include, for example, facilitating axial and radial floatation of a nut to accommodate off-axis fasteners and facilitating self-alignment of the fasteners. In addition, embodiments of the fastener assemblies facilitate mechanical locking of the fastener assembly using, for example magnetic components to switch a locked/unlocked state. Accordingly, embodiments of the fastener assemblies do not rely on friction between threads on a nut and threads on a bolt to provide a locking action. As a result, the fastener assemblies may provide a more reliable lock and facilitate more easily switching between locked and unlocked states.

Embodiments of fastener assemblies facilitate use of a longitudinally fixed position retaining ring to capture a fastener. The fastener assemblies reduce breaking and binding of the ring that would occur if the ring could travel longitudinally along grooves in the fastener. As a result, breakage of the ring is reduced and foreign object debris from a broken or degraded retaining ring is eliminated.

Exemplary embodiments of spring-loaded nut plate assemblies are described above. The systems and methods are not limited to the specific embodiments described herein, but rather, components of the systems and/or operations of the methods may be utilized independently and separately from other components and/or operations described herein. Further, the described components and/or operations may also be defined in, or used in combination with, other systems, methods, and/or devices, and are not limited to practice with only the systems described herein.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A fastener assembly comprising:
a threaded fastener;
a nut defining a bore configured to receive the threaded fastener;

a lock member, wherein the fastener assembly has a locked configuration in which the lock member is configured to fix rotation of the threaded fastener relative to the nut and an unlocked configuration in which the threaded fastener is allowed to rotate relative to the nut;

a magnetic component configured to engage the lock member and switch the fastener assembly between the locked configuration and the unlocked configuration; and at least one fastener tooth on a tip of the threaded fastener, the lock member configured to engage the at least one fastener tooth when the fastener assembly is in the locked configuration.

2. A fastener assembly in accordance with claim 1, further comprising a shell comprising a wall and having a first end and a second end opposite the first end, wherein the nut is disposed within the shell and moveable axially within the shell.

3. A fastener assembly in accordance with claim 2, wherein the magnetic component is disposed within the shell.

4. A fastener assembly in accordance with claim 2 further comprising a first bias member disposed within the shell, wherein the first bias member is configured to bias the nut toward one of a first position and a second position.

5. A fastener assembly in accordance with claim 1, wherein the lock member is coupled to the nut and configured to engage the threaded fastener when the fastener assembly is in the locked configuration.

6. A fastener assembly in accordance with claim 1, wherein the at least one fastener tooth and the threaded fastener are a single piece.

7. A fastener assembly in accordance with claim 1, wherein the lock member comprises a plurality of ratchet teeth configured to engage the at least one fastener tooth.

8. A fastener assembly in accordance with claim 1, wherein the magnetic component comprises a ring defining an aperture to receive the nut.

9. A fastener assembly in accordance with claim 8, wherein the lock member comprises a base and a pair of lock arms extending axially from the base, the pair of lock arms configured to engage the ring.

10. A nut plate assembly comprising:

a shell comprising a first end and a second end opposite the first end;

a floating nut disposed within the shell and defining a bore configured to receive a threaded fastener, wherein the nut plate assembly has a locked configuration in which rotation of the threaded fastener is fixed relative to the floating nut and an unlocked configuration in which the threaded fastener is allowed to rotate relative to the floating nut; and a magnetic component configured to switch the nut plate assembly between the locked configuration and the unlocked configuration.

11. A nut plate assembly in accordance with claim 10, further comprising a plate, wherein the first end of the shell is removably coupled to the plate.

12. A nut plate assembly in accordance with claim 10, further comprising a plate, wherein the shell and the plate are a single piece.

13. A nut plate assembly in accordance with claim 10, wherein the magnetic component is disposed within the shell, wherein the magnetic component is configured to move a lock member axially to switch the nut plate assembly between the locked configuration and the unlocked configuration.

14. A nut plate assembly in accordance with claim 10 further comprising a first bias member disposed within the shell, the first bias member configured to bias the floating nut toward one of a first position and a second position.

15. A nut plate assembly in accordance with claim 14 further comprising a second bias member disposed within the shell and configured to bias a lock member toward the locked configuration.

16. A nut plate assembly in accordance with claim 10, wherein the magnetic component comprises a ring defining an aperture to receive the floating nut.

17. A nut plate assembly in accordance with claim 16, further comprising a lock member comprising a base and a pair of lock arms extending axially from the base, the pair of lock arms configured to engage the ring.

18. A nut plate assembly in accordance with claim 10, wherein the shell is shaped to prevent rotation of the floating nut relative to the shell, and wherein the floating nut is configured to move axially relative to the shell between a first position and a second position.

19. A nut plate assembly in accordance with claim 10, in combination with a tool configured to engage and rotate the threaded fastener when the nut plate assembly is in the unlocked configuration, wherein the tool includes at least one magnet that is configured to interact with the magnetic component to switch the nut plate assembly between the locked configuration and the unlocked configuration.

* * * * *